United States Patent
Franklin et al.

(10) Patent No.: US 12,436,101 B2
(45) Date of Patent: Oct. 7, 2025

(54) MICROSCOPY UNIT

(71) Applicant: S.D. Sight Diagnostics Ltd., Tel Aviv (IL)

(72) Inventors: Amitai Franklin, Tel Aviv (IL); Trevor Ruggiero, Somerville, MA (US); Sarah Levy, Jaffa (IL); Joseph Joel Pollak, Neve Daniel (IL); Aidan John Carroll, Anchorage, AK (US); Sharon Pecker, Rehovot (IL); Yochay Shlomo Eshel, Sde Warburg (IL)

(73) Assignee: S.D. Sight Diagnostics Ltd., Tel Aviv (IL)

( * ) Notice: Subject to any disclaimer, the term of this patent is extended or adjusted under 35 U.S.C. 154(b) by 638 days.

(21) Appl. No.: 17/836,561

(22) Filed: Jun. 9, 2022

(65) Prior Publication Data
US 2022/0299436 A1      Sep. 22, 2022

Related U.S. Application Data

(63) Continuation of application No. PCT/IB2020/061731, filed on Dec. 10, 2020.
(Continued)

(51) Int. Cl.
*G02B 21/02* (2006.01)
*G01N 21/31* (2006.01)
(Continued)

(52) U.S. Cl.
CPC ....... *G01N 21/3577* (2013.01); *G01N 21/314* (2013.01); *G02B 21/02* (2013.01);
(Continued)

(58) Field of Classification Search
CPC .... G02B 21/02; G02B 21/361; G02B 21/362; G01N 21/3577; G01N 21/314;
(Continued)

(56) References Cited

U.S. PATENT DOCUMENTS

| | | |
|---|---|---|
| 3,203,768 A | 8/1965 | Tiller et al. |
| 3,603,156 A | 9/1971 | Konkol |

(Continued)

FOREIGN PATENT DOCUMENTS

| | | |
|---|---|---|
| CA | 2655024 C | 11/2014 |
| CN | 1918501 A | 2/2007 |

(Continued)

OTHER PUBLICATIONS

A. K. Sawhney et al., "Erythrocyte Alterations Induced by Malathion in Channa punctatus (Bloch)", Bull. Environ. Contam. Toxicol, 2000, vol. 64, pp. 398-405 (9 pages total).

(Continued)

*Primary Examiner* — Mustak Choudhury
(74) *Attorney, Agent, or Firm* — Sughrue Mion, PLLC

(57) ABSTRACT

Apparatus and methods are described for use with a microscopy unit that comprises an objective lens and a microscope camera. A cantilever includes an objective lens housing. A motor moves the cantilever along a direction of the optical axis of the objective lens. The cantilever is configured, during the movement of the cantilever, to support the objective lens within the objective lens housing such that an optical axis of the objective lens is aligned with the camera, without the objective lens being directly connected to the camera. Other applications are also described.

19 Claims, 11 Drawing Sheets

Related U.S. Application Data

(60) Provisional application No. 62/946,986, filed on Dec. 12, 2019, provisional application No. 62/947,001, filed on Dec. 12, 2019.

(51) Int. Cl.
  *G01N 21/3577* (2014.01)
  *G02B 21/36* (2006.01)

(52) U.S. Cl.
  CPC .......... *G02B 21/361* (2013.01); *G02B 21/362* (2013.01); *G01N 2021/3148* (2013.01)

(58) Field of Classification Search
  CPC ....... G01N 2021/3148; G01N 21/3151; G01N 2021/3181
  See application file for complete search history.

(56) References Cited

U.S. PATENT DOCUMENTS

| | | |
|---|---|---|
| 3,676,076 A | 7/1972 | Grady |
| 3,786,184 A | 1/1974 | Pieters |
| 3,916,205 A | 10/1975 | Kleinerman |
| 3,967,056 A | 6/1976 | Yata et al. |
| 4,030,888 A | 6/1977 | Yamamoto |
| 4,076,419 A | 2/1978 | Kleker |
| 4,097,845 A | 6/1978 | Bacus |
| 4,199,748 A | 4/1980 | Bacus |
| 4,209,548 A | 6/1980 | Bacus |
| 4,350,884 A | 9/1982 | Vollath |
| 4,453,266 A | 6/1984 | Bacus |
| 4,454,235 A | 6/1984 | Johnson |
| 4,494,479 A | 1/1985 | Drury et al. |
| 4,580,895 A | 4/1986 | Patel |
| 4,700,298 A | 10/1987 | Palcic et al. |
| 4,761,381 A | 8/1988 | Blatt et al. |
| 4,774,192 A | 9/1988 | Terminiello et al. |
| 4,803,352 A | 2/1989 | Bierleutgeb |
| 4,849,430 A | 7/1989 | Fleet |
| 4,851,330 A | 7/1989 | Kohne |
| 4,902,101 A | 2/1990 | Fujihara et al. |
| 5,001,067 A | 3/1991 | Coleman et al. |
| 5,064,282 A | 11/1991 | Curtis |
| 5,229,265 A | 7/1993 | Tometsko |
| 5,281,517 A | 1/1994 | Bacus et al. |
| 5,300,779 A | 4/1994 | Hillman et al. |
| 5,331,958 A | 7/1994 | Oppenheimer |
| 5,376,790 A * | 12/1994 | Linker ................. G02B 21/002 977/851 |
| 5,430,542 A | 7/1995 | Shepherd et al. |
| 5,470,751 A | 11/1995 | Sakata et al. |
| 5,499,097 A | 3/1996 | Ortyn et al. |
| 5,566,249 A | 10/1996 | Rosenlof et al. |
| 5,625,706 A | 4/1997 | Lee et al. |
| 5,663,057 A | 9/1997 | Drocourt et al. |
| 5,671,288 A | 9/1997 | Wilhelm et al. |
| 5,672,861 A | 9/1997 | Fairley et al. |
| 5,674,457 A | 10/1997 | Williamsson et al. |
| 5,745,804 A | 4/1998 | Iwane |
| 5,782,770 A | 7/1998 | Mooradian et al. |
| 5,784,162 A | 7/1998 | Cabib et al. |
| 5,827,190 A | 10/1998 | Palcic et al. |
| 5,834,217 A | 11/1998 | Levine et al. |
| 5,932,872 A | 8/1999 | Price |
| 5,939,709 A * | 8/1999 | Ghislain ................. G02B 21/02 250/234 |
| 5,948,686 A | 9/1999 | Wardlaw et al. |
| 5,978,497 A | 11/1999 | Lee et al. |
| 5,985,595 A | 11/1999 | Krider et al. |
| 5,993,702 A | 11/1999 | Davis |
| 6,005,964 A | 12/1999 | Reid et al. |
| 6,027,695 A | 2/2000 | Oldenburg et al. |
| 6,064,474 A | 5/2000 | Lee |
| 6,074,879 A | 6/2000 | Zelmanovic |
| 6,101,404 A | 8/2000 | Yoon |
| 6,235,536 B1 | 5/2001 | Wardlaw |
| 6,262,423 B1 | 7/2001 | Hell et al. |
| 6,262,798 B1 | 7/2001 | Shepherd et al. |
| 6,320,979 B1 | 11/2001 | Melen |
| 6,330,348 B1 | 12/2001 | Kerschmann et al. |
| 6,339,472 B1 | 1/2002 | Hafeman |
| 6,350,613 B1 | 2/2002 | Wardlaw et al. |
| 6,448,024 B1 | 9/2002 | Bruegger |
| 6,519,355 B2 | 2/2003 | Nelson |
| 6,538,249 B1 | 3/2003 | Takane et al. |
| 6,554,788 B1 | 4/2003 | Hunley et al. |
| 6,582,964 B1 | 6/2003 | Samsoondar et al. |
| 6,611,777 B2 | 8/2003 | Samsoondar |
| 6,632,681 B1 | 10/2003 | Chu |
| 6,658,143 B2 | 12/2003 | Hansen |
| 6,664,528 B1 | 12/2003 | Cartlidge et al. |
| 6,711,516 B2 | 3/2004 | Samsoondar |
| 6,799,119 B1 | 9/2004 | Voorhees et al. |
| 6,819,408 B1 | 11/2004 | Scrivens et al. |
| 6,831,733 B2 | 12/2004 | Pettersson |
| 6,834,237 B2 | 12/2004 | Noergaard et al. |
| 6,836,559 B2 | 12/2004 | Abdel-Fattah |
| 6,842,233 B2 | 1/2005 | Narisada |
| 6,866,823 B2 | 3/2005 | Wardlaw |
| 6,872,930 B2 | 3/2005 | Cartlidge et al. |
| 6,898,451 B2 | 5/2005 | Wuori |
| 6,903,323 B2 | 6/2005 | Cartlidge et al. |
| 6,929,953 B1 | 8/2005 | Wardlaw et al. |
| 6,949,384 B2 | 9/2005 | Samsoondar |
| 6,955,872 B2 | 10/2005 | Maples et al. |
| 6,956,650 B2 | 10/2005 | Boas |
| 6,989,891 B2 | 1/2006 | Braig et al. |
| 7,027,628 B1 | 4/2006 | Gagnon |
| 7,030,351 B2 | 4/2006 | Wasserman |
| 7,034,883 B1 | 4/2006 | Rosenqvist |
| 7,105,795 B2 | 9/2006 | Cartlidge et al. |
| 7,132,636 B1 | 11/2006 | Cartlidge |
| 7,133,547 B2 | 11/2006 | Marcelpoil |
| 7,151,246 B2 | 12/2006 | Fein et al. |
| 7,155,049 B2 | 12/2006 | Wetzel |
| 7,214,936 B2 | 5/2007 | Sato et al. |
| 7,248,716 B2 | 7/2007 | Fein et al. |
| 7,274,810 B2 | 9/2007 | Reeves et al. |
| 7,283,217 B2 | 10/2007 | Ikeuchi |
| 7,288,751 B2 | 10/2007 | Cartlidge et al. |
| 7,305,109 B1 | 12/2007 | Gagnon |
| 7,324,694 B2 | 1/2008 | Chapoulaud |
| 7,329,537 B2 | 2/2008 | Qiu |
| 7,338,168 B2 | 3/2008 | Cartlidge et al. |
| 7,344,890 B2 | 3/2008 | Perez et al. |
| 7,346,205 B2 | 3/2008 | Walker, Jr. |
| 7,369,696 B2 | 5/2008 | Arini et al. |
| 7,385,168 B2 | 6/2008 | Cartlidge et al. |
| 7,387,898 B1 | 6/2008 | Gordon |
| 7,411,680 B2 | 8/2008 | Chang |
| 7,417,213 B2 | 8/2008 | Krief et al. |
| 7,425,421 B2 | 9/2008 | Dertinger |
| 7,439,478 B2 | 10/2008 | Cartlidge et al. |
| 7,450,223 B2 | 11/2008 | Ikeuchi |
| 7,450,762 B2 | 11/2008 | Morell |
| 7,460,222 B2 | 12/2008 | Kalveram |
| 7,490,085 B2 | 2/2009 | Walker et al. |
| 7,493,219 B1 | 2/2009 | Qi |
| 7,580,120 B2 | 8/2009 | Hamada |
| 7,599,893 B2 | 10/2009 | Sapir |
| 7,601,938 B2 | 10/2009 | Cartlidge et al. |
| 7,602,954 B2 | 10/2009 | Marcelpoil |
| 7,605,356 B2 | 10/2009 | Krief |
| 7,609,369 B2 | 10/2009 | Simon-Lopez |
| 7,630,063 B2 | 12/2009 | Padmanabhan |
| 7,633,604 B2 | 12/2009 | Ikeuchi |
| 7,638,748 B2 | 12/2009 | Krief et al. |
| 7,663,738 B2 | 2/2010 | Johansson |
| 7,668,362 B2 | 2/2010 | Olson |
| 7,692,131 B2 | 4/2010 | Fein et al. |
| 7,697,764 B2 | 4/2010 | Kataoka |
| 7,702,181 B2 | 4/2010 | Gouch |
| 7,706,862 B2 | 4/2010 | Alfano et al. |
| 7,713,474 B2 | 5/2010 | Schulman et al. |

(56) References Cited

U.S. PATENT DOCUMENTS

| | | |
|---|---|---|
| 7,747,153 B2 | 6/2010 | Ibaraki |
| 7,765,069 B2 | 7/2010 | Ostoich |
| 7,777,869 B2 | 8/2010 | Nerin |
| 7,787,109 B2 | 8/2010 | Dosmann et al. |
| 7,796,797 B2 | 9/2010 | Nakaya et al. |
| 7,863,552 B2 | 1/2011 | Cartlidge et al. |
| 7,869,009 B2 | 1/2011 | Dosmann et al. |
| 7,894,047 B2 | 2/2011 | Hamada |
| 7,911,617 B2 | 3/2011 | Padmanabhan |
| 7,925,070 B2 | 4/2011 | Sumida |
| 7,929,121 B2 | 4/2011 | Wardlaw |
| 7,933,435 B2 | 4/2011 | Hunter |
| 7,936,913 B2 | 5/2011 | Nordell |
| 7,951,599 B2 | 5/2011 | Levine |
| 7,995,200 B2 | 8/2011 | Matsumoto |
| 7,998,435 B2 | 8/2011 | Reed |
| 8,000,511 B2 | 8/2011 | Perz |
| 8,044,974 B2 | 10/2011 | Sumida |
| 8,045,782 B2 | 10/2011 | Li |
| 8,055,471 B2 | 11/2011 | Qi |
| 8,064,680 B2 | 11/2011 | Ramoser |
| 8,077,296 B2 | 12/2011 | Wardlaw |
| 8,081,303 B2 | 12/2011 | Levine |
| 8,105,554 B2 | 1/2012 | Kanigan et al. |
| 8,125,643 B2 | 2/2012 | Hansen |
| D655,421 S | 3/2012 | Lee et al. |
| 8,131,035 B2 | 3/2012 | Grady |
| 8,131,052 B2 | 3/2012 | Alexandrov |
| 8,150,114 B2 | 4/2012 | Svanberg |
| 8,154,713 B2 | 4/2012 | Simon-Lopez |
| 8,165,385 B2 | 4/2012 | Reeves |
| 8,175,353 B2 | 5/2012 | Westphal |
| 8,179,597 B2 | 5/2012 | Namba |
| 8,184,273 B2 | 5/2012 | Dosmann |
| 8,192,995 B2 | 6/2012 | Zhang et al. |
| 8,216,832 B2 | 7/2012 | Battrell et al. |
| 8,224,058 B2 | 7/2012 | Lindberg |
| 8,269,954 B2 | 9/2012 | Levine |
| 8,280,134 B2 | 10/2012 | Hoyt |
| 8,310,659 B2 | 11/2012 | Wardlaw |
| 8,314,837 B2 | 11/2012 | Kenny et al. |
| 8,320,655 B2 | 11/2012 | Sarachan |
| 8,327,724 B2 | 12/2012 | Fairs |
| 8,331,627 B2 | 12/2012 | Xiong et al. |
| 8,331,642 B2 | 12/2012 | Zerfass |
| 8,339,586 B2 | 12/2012 | Zahniser |
| 8,345,227 B2 | 1/2013 | Zahniser |
| 8,351,676 B2 | 1/2013 | Dai |
| 8,363,221 B2 | 1/2013 | Hansen |
| 8,379,944 B2 | 2/2013 | Grady |
| 8,406,498 B2 | 3/2013 | Ortyn |
| 8,428,331 B2 | 4/2013 | Dimarzio |
| 8,432,392 B2 | 4/2013 | Kim |
| 8,477,294 B2 | 7/2013 | Zahniser |
| 8,481,303 B2 | 7/2013 | Faris et al. |
| 8,488,111 B2 | 7/2013 | Zahniser |
| 8,491,499 B2 | 7/2013 | Choi et al. |
| 8,526,704 B2 | 9/2013 | Dobbe |
| 8,565,480 B2 | 10/2013 | Eichhorn et al. |
| 8,570,496 B2 | 10/2013 | Chen |
| 8,582,924 B2 | 11/2013 | De La |
| 8,638,427 B2 | 1/2014 | Wardlaw |
| 8,712,142 B2 | 4/2014 | Rajpoot |
| 8,736,824 B2 | 5/2014 | Matsui |
| 8,744,165 B2 | 6/2014 | Liu |
| 8,778,687 B2 | 7/2014 | Levine |
| 8,787,650 B2 | 7/2014 | Marugame |
| 8,792,693 B2 | 7/2014 | Satish |
| 8,837,803 B2 | 9/2014 | Wang et al. |
| 8,849,024 B2 | 9/2014 | Shinoda |
| 8,873,827 B2 | 10/2014 | Mcculloch |
| 8,877,458 B2 | 11/2014 | Maurer |
| 8,878,923 B2 | 11/2014 | Henderson |
| 8,885,154 B2 | 11/2014 | Wardlaw |
| 8,885,912 B2 | 11/2014 | Sui |
| 8,891,851 B2 | 11/2014 | Spaulding |
| 8,922,761 B2 | 12/2014 | Zahniser |
| 8,942,458 B2 | 1/2015 | Takahashi |
| 8,964,171 B2 | 2/2015 | Zahniser |
| 8,992,750 B1 | 3/2015 | Beaty |
| 8,994,930 B2 | 3/2015 | Levine |
| 9,012,868 B2 | 4/2015 | Courtney et al. |
| 9,041,792 B2 | 5/2015 | Van Leeuwen |
| 9,046,473 B2 | 6/2015 | Levine |
| 9,050,595 B2 | 6/2015 | Miller et al. |
| 9,064,301 B2 | 6/2015 | Zie et al. |
| 9,088,729 B2 | 7/2015 | Takayama |
| 9,176,121 B2 | 11/2015 | Winkelman et al. |
| 9,186,843 B2 | 11/2015 | Chan et al. |
| 9,235,041 B2 | 1/2016 | Crandall |
| 9,240,043 B2 | 1/2016 | Christiansen |
| 9,322,767 B2 | 4/2016 | Ehrenkranz |
| 9,329,129 B2 | 5/2016 | Pollak et al. |
| 9,332,190 B2 | 5/2016 | Murakami |
| 9,342,734 B2 | 5/2016 | Lin et al. |
| 9,349,208 B2 | 5/2016 | Eichhorn |
| 9,404,852 B2 | 8/2016 | Braig et al. |
| 9,470,609 B2 | 10/2016 | Wimberger-friedl |
| 9,477,875 B2 | 10/2016 | Ohya |
| 9,522,396 B2 | 12/2016 | Bachelet |
| 9,528,978 B2 | 12/2016 | Yamada |
| 9,588,033 B2 | 3/2017 | Zahniser et al. |
| 9,690,974 B2 | 6/2017 | Obrien et al. |
| 9,767,343 B1 | 9/2017 | Jones et al. |
| 9,820,990 B2 | 11/2017 | Pak et al. |
| 9,930,241 B2 | 3/2018 | Oshima et al. |
| 9,933,363 B2 | 4/2018 | Danuser et al. |
| 9,934,571 B2 | 4/2018 | Ozaki |
| 9,976,945 B2 | 5/2018 | Kendall et al. |
| 10,024,858 B2 | 7/2018 | Smith et al. |
| 10,061,972 B2 | 8/2018 | Champlin |
| 10,093,957 B2 | 10/2018 | Pollak et al. |
| 10,132,738 B2 | 11/2018 | Obrien et al. |
| 10,139,613 B2 | 11/2018 | Hing et al. |
| 10,169,861 B2 | 1/2019 | Ozaki et al. |
| 10,176,565 B2 | 1/2019 | Greenfield |
| 10,210,376 B2 | 2/2019 | Hedlund et al. |
| 10,217,219 B2 | 2/2019 | Rimm et al. |
| 10,269,094 B2 | 4/2019 | Fuchs |
| 10,281,386 B2 | 5/2019 | Hsu et al. |
| 10,330,910 B2 | 6/2019 | Iwase et al. |
| 10,353,190 B2 | 7/2019 | Hulsken et al. |
| 10,395,368 B2 | 8/2019 | Berexhna et al. |
| 10,482,595 B2 | 11/2019 | Yorav-Rafael |
| 10,488,644 B2 | 11/2019 | Eshel |
| 10,508,983 B2 | 12/2019 | Kendall et al. |
| 10,527,635 B1 | 1/2020 | Bhatia et al. |
| 10,640,807 B2 | 5/2020 | Pollak |
| 10,663,712 B2 | 5/2020 | Eshel |
| 10,843,190 B2 | 11/2020 | Bachelet |
| 11,099,175 B2 | 8/2021 | Zait |
| 11,199,690 B2 | 12/2021 | Eshel |
| 11,207,836 B2 | 12/2021 | Ramos et al. |
| 11,609,413 B2 | 3/2023 | Yorav-Raphael et al. |
| 2002/0009711 A1 | 1/2002 | Wada et al. |
| 2002/0028158 A1 | 3/2002 | Wardlaw et al. |
| 2002/0028471 A1 | 3/2002 | Oberhardt |
| 2003/0017085 A1 | 1/2003 | Kercso et al. |
| 2003/0161514 A1 | 8/2003 | Curry |
| 2003/0170613 A1 | 9/2003 | Straus |
| 2003/0197925 A1 | 10/2003 | Hamborg |
| 2003/0208140 A1 | 11/2003 | Pugh |
| 2003/0224522 A1 | 12/2003 | de Jong |
| 2003/0227612 A1 | 12/2003 | Fein et al. |
| 2003/0227673 A1 | 12/2003 | Nakagawa |
| 2003/0228038 A1 | 12/2003 | Douglass et al. |
| 2003/0231791 A1 | 12/2003 | Torre-Bueno et al. |
| 2004/0004614 A1 | 1/2004 | Bacus et al. |
| 2004/0054283 A1 | 3/2004 | Corey et al. |
| 2004/0122216 A1 | 6/2004 | Nielsen |
| 2004/0132171 A1 | 7/2004 | Rule et al. |
| 2004/0170312 A1 | 9/2004 | Soenksen |
| 2004/0185447 A1 | 9/2004 | Maples et al. |

(56) References Cited

U.S. PATENT DOCUMENTS

| | | | |
|---|---|---|---|
| 2004/0218804 A1* | 11/2004 | Affleck | G02B 21/0016 382/141 |
| 2004/0240050 A1 | 12/2004 | Ogihara | |
| 2004/0241677 A1 | 12/2004 | Lin et al. | |
| 2004/0256538 A1 | 12/2004 | Olson et al. | |
| 2005/0089208 A1 | 4/2005 | Dong et al. | |
| 2005/0109959 A1 | 5/2005 | Wasserman et al. | |
| 2005/0117204 A1* | 6/2005 | Kinoshita | G02B 21/362 359/368 |
| 2005/0175992 A1 | 8/2005 | Aberl et al. | |
| 2005/0270611 A1 | 12/2005 | Oshiro et al. | |
| 2005/0282292 A1 | 12/2005 | Torre-Bueno et al. | |
| 2005/0286800 A1 | 12/2005 | Gouch | |
| 2006/0001955 A1 | 1/2006 | Kinney et al. | |
| 2006/0002817 A1 | 1/2006 | Bohm | |
| 2006/0003458 A1 | 1/2006 | Golovchenko et al. | |
| 2006/0007345 A1 | 1/2006 | Olson et al. | |
| 2006/0045505 A1 | 3/2006 | Zeineh | |
| 2006/0051778 A1 | 3/2006 | Kallick | |
| 2006/0063185 A1 | 3/2006 | Vannier | |
| 2006/0079144 A1 | 4/2006 | Klisch et al. | |
| 2006/0098861 A1 | 5/2006 | See et al. | |
| 2006/0187442 A1 | 8/2006 | Chang et al. | |
| 2006/0190226 A1 | 8/2006 | Jojic et al. | |
| 2006/0210428 A1 | 9/2006 | Lindberg et al. | |
| 2006/0222567 A1 | 10/2006 | Kloepfer et al. | |
| 2006/0223052 A1 | 10/2006 | MacDonald et al. | |
| 2006/0223165 A1 | 10/2006 | Chang et al. | |
| 2006/0226362 A1 | 10/2006 | Kitsuki et al. | |
| 2007/0054350 A1 | 3/2007 | Walker, Jr. | |
| 2007/0076190 A1 | 4/2007 | Nakaya et al. | |
| 2007/0161075 A1 | 7/2007 | Gleich | |
| 2007/0172956 A1 | 7/2007 | Magari et al. | |
| 2007/0231914 A1 | 10/2007 | Deng et al. | |
| 2007/0243117 A1 | 10/2007 | Wardlaw et al. | |
| 2007/0250301 A1 | 10/2007 | Vaisberg et al. | |
| 2007/0252984 A1 | 11/2007 | Van Beek et al. | |
| 2008/0002868 A1 | 1/2008 | Ando et al. | |
| 2008/0012978 A1 | 1/2008 | Wang | |
| 2008/0019584 A1 | 1/2008 | Lindberg et al. | |
| 2008/0020128 A1 | 1/2008 | van Ryper | |
| 2008/0059135 A1 | 3/2008 | Murugkar et al. | |
| 2008/0118399 A1 | 5/2008 | Fleming | |
| 2008/0153098 A1 | 6/2008 | Rimm et al. | |
| 2008/0187466 A1 | 8/2008 | Wardlaw et al. | |
| 2008/0212069 A1 | 9/2008 | Goldberg et al. | |
| 2008/0260369 A1 | 10/2008 | Ibaraki | |
| 2008/0273776 A1 | 11/2008 | Krief et al. | |
| 2008/0305514 A1 | 12/2008 | Alford et al. | |
| 2009/0046909 A1 | 2/2009 | Rutenberg et al. | |
| 2009/0066934 A1 | 3/2009 | Gao et al. | |
| 2009/0074282 A1 | 3/2009 | Pinard et al. | |
| 2009/0075324 A1 | 3/2009 | Pettersson | |
| 2009/0086314 A1 | 4/2009 | Namba | |
| 2009/0088336 A1 | 4/2009 | Burd et al. | |
| 2009/0128618 A1 | 5/2009 | Fahn et al. | |
| 2009/0185734 A1 | 7/2009 | Lindberg et al. | |
| 2009/0191098 A1 | 7/2009 | Beard et al. | |
| 2009/0195688 A1 | 8/2009 | Henderson et al. | |
| 2009/0213214 A1 | 8/2009 | Yamada | |
| 2009/0238437 A1 | 9/2009 | Levine et al. | |
| 2009/0258347 A1 | 10/2009 | Scott | |
| 2009/0269799 A1 | 10/2009 | Winkelman et al. | |
| 2009/0291854 A1 | 11/2009 | Wiesinger-Mayr et al. | |
| 2010/0003265 A1 | 1/2010 | Scheffler | |
| 2010/0068747 A1 | 3/2010 | Herrenknecht | |
| 2010/0104169 A1 | 4/2010 | Yamada | |
| 2010/0112631 A1 | 5/2010 | Hur et al. | |
| 2010/0120129 A1 | 5/2010 | Amshey et al. | |
| 2010/0136556 A1 | 6/2010 | Friedberger et al. | |
| 2010/0136570 A1 | 6/2010 | Goldberg et al. | |
| 2010/0152054 A1 | 6/2010 | Love | |
| 2010/0157086 A1 | 6/2010 | Segale et al. | |
| 2010/0172020 A1 | 7/2010 | Price | |
| 2010/0192706 A1 | 8/2010 | Fairs | |
| 2010/0232675 A1 | 9/2010 | Ortyn et al. | |
| 2010/0234703 A1 | 9/2010 | Sterling et al. | |
| 2010/0253907 A1 | 10/2010 | Korb | |
| 2010/0254596 A1 | 10/2010 | Xiong | |
| 2010/0256918 A1 | 10/2010 | Chen et al. | |
| 2010/0265323 A1 | 10/2010 | Perz | |
| 2010/0272334 A1 | 10/2010 | Yamada et al. | |
| 2010/0295998 A1 | 11/2010 | Sakai et al. | |
| 2010/0300563 A1 | 12/2010 | Ramunas et al. | |
| 2011/0007178 A1 | 1/2011 | Kahlman | |
| 2011/0009163 A1 | 1/2011 | Fletcher | |
| 2011/0030458 A1 | 2/2011 | Park et al. | |
| 2011/0059481 A1 | 3/2011 | Wardlaw et al. | |
| 2011/0102571 A1 | 5/2011 | Yoneyama | |
| 2011/0123398 A1 | 5/2011 | Carrhilo et al. | |
| 2011/0144480 A1 | 6/2011 | Lu et al. | |
| 2011/0149097 A1 | 6/2011 | Danuser et al. | |
| 2011/0151502 A1 | 6/2011 | Kendall et al. | |
| 2011/0178716 A1 | 7/2011 | Krockenberger et al. | |
| 2011/0212486 A1 | 9/2011 | Yamada | |
| 2011/0243794 A1 | 10/2011 | Wardlaw | |
| 2011/0249910 A1 | 10/2011 | Henderson | |
| 2011/0260055 A1 | 10/2011 | Wang et al. | |
| 2011/0275111 A1 | 11/2011 | Pettigrew et al. | |
| 2011/0301012 A1 | 12/2011 | Dolecek et al. | |
| 2012/0002195 A1 | 1/2012 | Wu et al. | |
| 2012/0007977 A1 | 1/2012 | Yamamoto et al. | |
| 2012/0013727 A1 | 1/2012 | Breniman et al. | |
| 2012/0021951 A1 | 1/2012 | Hess et al. | |
| 2012/0030618 A1 | 2/2012 | Leong et al. | |
| 2012/0044342 A1 | 2/2012 | Hing et al. | |
| 2012/0058504 A1 | 3/2012 | Li et al. | |
| 2012/0092477 A1 | 4/2012 | Kawano et al. | |
| 2012/0120221 A1 | 5/2012 | Dong et al. | |
| 2012/0162495 A1 | 6/2012 | Ogawa | |
| 2012/0169863 A1 | 7/2012 | Bachelet et al. | |
| 2012/0225446 A1 | 9/2012 | Wimberger-friedl et al. | |
| 2012/0237107 A1 | 9/2012 | Tawfik et al. | |
| 2012/0249770 A1 | 10/2012 | Hamm | |
| 2012/0275671 A1 | 11/2012 | Eichhorn et al. | |
| 2012/0288157 A1 | 11/2012 | Kishima | |
| 2012/0312957 A1 | 12/2012 | Loney et al. | |
| 2012/0320045 A1 | 12/2012 | Yao | |
| 2013/0016885 A1 | 1/2013 | Tsujimoto | |
| 2013/0023007 A1 | 1/2013 | Zahniser et al. | |
| 2013/0078668 A1 | 3/2013 | Levine et al. | |
| 2013/0100272 A1 | 4/2013 | Price et al. | |
| 2013/0130262 A1 | 5/2013 | Battrell et al. | |
| 2013/0169948 A1 | 7/2013 | Xie | |
| 2013/0170730 A1 | 7/2013 | Yu et al. | |
| 2013/0176551 A1 | 7/2013 | Wardlaw et al. | |
| 2013/0177974 A1 | 7/2013 | Mamghani et al. | |
| 2013/0203082 A1 | 8/2013 | Gonda et al. | |
| 2013/0236566 A1 | 9/2013 | Higgins | |
| 2013/0258058 A1 | 10/2013 | Wanatabe et al. | |
| 2013/0273968 A1 | 10/2013 | Rhoads et al. | |
| 2013/0284924 A1 | 10/2013 | Mizuochi et al. | |
| 2013/0290225 A1 | 10/2013 | Kamath et al. | |
| 2013/0323757 A1 | 12/2013 | Poher | |
| 2013/0342902 A1 | 12/2013 | Krueger et al. | |
| 2014/0027076 A1 | 1/2014 | Begley et al. | |
| 2014/0139625 A1 | 5/2014 | Mathuis et al. | |
| 2014/0139630 A1 | 5/2014 | Kowalevicz | |
| 2014/0185906 A1 | 7/2014 | Ding et al. | |
| 2014/0186859 A1 | 7/2014 | Calderwood et al. | |
| 2014/0205176 A1 | 7/2014 | Obrien et al. | |
| 2014/0270425 A1 | 9/2014 | Kenny et al. | |
| 2014/0273064 A1 | 9/2014 | Smith et al. | |
| 2014/0273076 A1 | 9/2014 | Adams et al. | |
| 2014/0322750 A1 | 10/2014 | Matsumoto et al. | |
| 2014/0347459 A1 | 11/2014 | Greenfield et al. | |
| 2014/0347463 A1 | 11/2014 | Lin | |
| 2014/0353524 A1 | 12/2014 | Danuser et al. | |
| 2015/0006105 A1 | 1/2015 | Zhou et al. | |
| 2015/0022882 A1 | 1/2015 | Ue et al. | |
| 2015/0029508 A1 | 1/2015 | Toyoda et al. | |
| 2015/0037806 A1 | 2/2015 | Pollak et al. | |
| 2015/0050643 A1 | 2/2015 | Matsumoto et al. | |
| 2015/0124082 A1 | 5/2015 | Kato et al. | |

(56) References Cited

U.S. PATENT DOCUMENTS

| | | |
|---|---|---|
| 2015/0168705 A1 | 6/2015 | O'Neill |
| 2015/0183153 A1 | 7/2015 | Chan et al. |
| 2015/0185459 A1 | 7/2015 | Clark et al. |
| 2015/0190063 A1 | 7/2015 | Zakharov et al. |
| 2015/0246170 A1 | 9/2015 | Miao et al. |
| 2015/0278575 A1 | 10/2015 | Allano et al. |
| 2015/0302237 A1 | 10/2015 | Ohya et al. |
| 2015/0316477 A1 | 11/2015 | Pollak et al. |
| 2016/0042507 A1 | 2/2016 | Turner |
| 2016/0146750 A1 | 5/2016 | Hughes et al. |
| 2016/0168614 A1 | 6/2016 | Hunt |
| 2016/0187235 A1 | 6/2016 | Fine |
| 2016/0202460 A1 | 7/2016 | Zheng |
| 2016/0208306 A1 | 7/2016 | Pollak et al. |
| 2016/0246046 A1 | 8/2016 | Yorav-Raphael et al. |
| 2016/0250312 A1 | 9/2016 | Longley |
| 2016/0279633 A1 | 9/2016 | Bachelet et al. |
| 2017/0003490 A1 | 1/2017 | Sueki et al. |
| 2017/0052110 A1 | 2/2017 | Malissek et al. |
| 2017/0115271 A1 | 4/2017 | Xie et al. |
| 2017/0146558 A1 | 5/2017 | Ishii et al. |
| 2017/0160185 A1 | 6/2017 | Minemura et al. |
| 2017/0191945 A1 | 7/2017 | Zhang et al. |
| 2017/0205612 A1* | 7/2017 | Carloni ............... G01N 21/648 |
| 2017/0218425 A1 | 8/2017 | Chen et al. |
| 2017/0292905 A1 | 10/2017 | Obrien et al. |
| 2017/0307496 A1 | 10/2017 | Zahniser et al. |
| 2017/0326549 A1 | 11/2017 | Jones et al. |
| 2017/0328924 A1 | 11/2017 | Jones et al. |
| 2018/0080885 A1 | 3/2018 | Ginsberg et al. |
| 2018/0156713 A1 | 6/2018 | Berezhna et al. |
| 2018/0171404 A1 | 6/2018 | Del Favero et al. |
| 2018/0246313 A1 | 8/2018 | Eshel et al. |
| 2018/0259318 A1 | 9/2018 | Yelin et al. |
| 2018/0296102 A1 | 10/2018 | Satish et al. |
| 2018/0297024 A1 | 10/2018 | Tran |
| 2019/0002950 A1 | 1/2019 | Pollak et al. |
| 2019/0087953 A1 | 3/2019 | Yorav-Rafael |
| 2019/0110718 A1 | 4/2019 | Brittenham et al. |
| 2019/0130567 A1 | 5/2019 | Greenfield |
| 2019/0145963 A1 | 5/2019 | Zait |
| 2019/0266723 A1 | 8/2019 | Blanchard et al. |
| 2019/0302099 A1 | 10/2019 | Pollak |
| 2019/0324255 A1 | 10/2019 | Pergande et al. |
| 2019/0347467 A1 | 11/2019 | Ohsaka et al. |
| 2020/0034967 A1 | 1/2020 | Yorav-Rafael |
| 2020/0049970 A1 | 2/2020 | Eshel |
| 2020/0111209 A1 | 4/2020 | Greenfield |
| 2020/0209604 A1 | 7/2020 | Chen et al. |
| 2020/0249458 A1 | 8/2020 | Eshel |
| 2020/0300750 A1 | 9/2020 | Eshel et al. |
| 2021/0069696 A1 | 3/2021 | Li et al. |
| 2022/0189016 A1 | 6/2022 | Barnes et al. |

FOREIGN PATENT DOCUMENTS

| | | |
|---|---|---|
| CN | 101403650 A | 4/2009 |
| CN | 101501785 A | 8/2009 |
| CN | 102282467 A | 12/2011 |
| CN | 104094118 A | 10/2014 |
| CN | 104471389 A | 3/2015 |
| CN | 105556276 A | 5/2016 |
| CN | 108474934 A | 8/2018 |
| EP | 0073551 A2 | 3/1983 |
| EP | 0479231 A1 | 4/1992 |
| EP | 0744191 A2 | 11/1996 |
| EP | 1 381 229 A1 | 1/2004 |
| EP | 1698883 A1 | 9/2006 |
| EP | 2145684 A2 | 1/2010 |
| EP | 2 211 165 A2 | 7/2010 |
| EP | 3001174 A1 | 3/2016 |
| EP | 3123927 | 2/2017 |
| EP | 3482189 A1 | 5/2019 |
| EP | 1 873 232 B1 | 2/2020 |
| GB | 2329014 A | 3/1999 |
| JP | 60-162955 A | 8/1985 |
| JP | 61-198204 A | 9/1986 |
| JP | 7-504038 A | 4/1995 |
| JP | H08-313340 A | 11/1996 |
| JP | 9-54083 A | 2/1997 |
| JP | 11-500832 A | 1/1999 |
| JP | H11-73903 A | 3/1999 |
| JP | 2000-199845 A | 7/2000 |
| JP | 2002-516982 A | 6/2002 |
| JP | 2003-315684 A | 11/2003 |
| JP | 2004-144526 A | 5/2004 |
| JP | 2004-257768 A | 9/2004 |
| JP | 2004-532410 A | 10/2004 |
| JP | 2005-218379 A | 8/2005 |
| JP | 2006-506607 A | 2/2006 |
| JP | 2006-294301 A | 10/2006 |
| JP | 2006-301270 A | 11/2006 |
| JP | 2007-40814 A | 2/2007 |
| JP | 2007-93470 A | 4/2007 |
| JP | 2008-5768 A | 1/2008 |
| JP | 2008-20498 A | 1/2008 |
| JP | 2009-180539 A | 8/2009 |
| JP | 2009-223164 A | 10/2009 |
| JP | 2009-233927 A | 10/2009 |
| JP | 2009-268432 A | 11/2009 |
| JP | 2011-95225 A | 5/2011 |
| JP | 2013-27368 A | 2/2013 |
| JP | 2013-515264 A | 5/2013 |
| JP | 2013-517460 A | 5/2013 |
| JP | 2013-541767 A | 11/2013 |
| JP | 2014-41139 A | 3/2014 |
| JP | 2014-44050 A | 3/2014 |
| JP | 2015-21938 A | 2/2015 |
| JP | 2015-57600 A | 3/2015 |
| JP | 2016-70658 A | 5/2016 |
| JP | 2016-71588 A | 5/2016 |
| JP | 2016-528506 A | 9/2016 |
| JP | 2016-189701 A | 11/2016 |
| JP | 2017-67524 A | 4/2017 |
| JP | 2017-209530 A | 11/2017 |
| JP | 2018-525611 A | 9/2018 |
| JP | 2018-534605 A | 11/2018 |
| JP | 2019-528459 A | 10/2019 |
| JP | 6952683 B2 | 10/2021 |
| RU | 2402006 C1 | 10/2010 |
| WO | 1985/005446 | 12/1985 |
| WO | 1996/001438 | 1/1996 |
| WO | 1996/012981 | 5/1996 |
| WO | 1996/013615 | 5/1996 |
| WO | 2000/006765 | 2/2000 |
| WO | 2000/052195 | 9/2000 |
| WO | 2000/055572 | 9/2000 |
| WO | 2002/033400 | 4/2002 |
| WO | 02/39059 | 5/2002 |
| WO | 2003/056327 | 7/2003 |
| WO | 2003/065358 A2 | 8/2003 |
| WO | 2003/073365 | 9/2003 |
| WO | 2003/081525 | 10/2003 |
| WO | 2004/020112 A1 | 3/2004 |
| WO | 2004/111610 | 12/2004 |
| WO | 2005/121863 | 12/2005 |
| WO | 2006/121266 | 11/2006 |
| WO | 2008/063135 | 5/2008 |
| WO | 2009/136570 A1 | 11/2009 |
| WO | 2009/136573 A1 | 11/2009 |
| WO | 2010/036827 | 4/2010 |
| WO | 2010/056740 | 5/2010 |
| WO | 2010/116341 | 10/2010 |
| WO | 2010/126903 | 11/2010 |
| WO | 2010/137543 A1 | 12/2010 |
| WO | 2011/056658 | 5/2011 |
| WO | 2011/076413 | 6/2011 |
| WO | 2011/123070 | 10/2011 |
| WO | 2011/143075 | 11/2011 |
| WO | 2012/000102 | 1/2012 |
| WO | 2012/029269 | 3/2012 |
| WO | 2012/030313 | 3/2012 |
| WO | 2012/090198 | 7/2012 |
| WO | 2012/107468 A1 | 8/2012 |

(56) References Cited

FOREIGN PATENT DOCUMENTS

| WO | 2012/154333 | | 11/2012 |
|---|---|---|---|
| WO | 2013/041951 | | 3/2013 |
| WO | 2013/098821 | | 7/2013 |
| WO | 2013/102076 | A1 | 7/2013 |
| WO | 2014/146063 | A3 | 9/2014 |
| WO | 2014/159620 | | 10/2014 |
| WO | 2014/188405 | | 11/2014 |
| WO | 2015/001553 | | 1/2015 |
| WO | 2015/029032 | | 3/2015 |
| WO | 2015/089632 | | 6/2015 |
| WO | 2016/021311 | A1 | 2/2016 |
| WO | 2016/030897 | | 3/2016 |
| WO | 2016/203320 | A2 | 12/2016 |
| WO | 2017/046799 | | 3/2017 |
| WO | 2017/168411 | | 10/2017 |
| WO | 2017/195205 | | 11/2017 |
| WO | 2017/195208 | | 11/2017 |
| WO | 2018/009920 | | 1/2018 |
| WO | 2018/102748 | A1 | 6/2018 |
| WO | 2019/035084 | | 2/2019 |
| WO | 2019/097387 | | 5/2019 |
| WO | 2019/102277 | | 5/2019 |
| WO | 2019/198094 | | 10/2019 |
| WO | 2021/079305 | | 4/2021 |
| WO | 2021/079306 | | 4/2021 |
| WO | 2021/116962 | A9 | 6/2021 |
| WO | 2022/009104 | A2 | 1/2022 |

OTHER PUBLICATIONS

An Extended European Search Report which issued on Mar. 20, 2023 for Application No. 22209948.3.
An International Preliminary Report on Patentability dated Feb. 28, 2017, which issued during the prosecution of Applicant's PCT/IL2015/050864.
An Office Action dated Feb. 17, 2023 which issued during the prosecution of U.S. Appl. No. 17/576,023.
An Office Action dated Feb. 22, 2023 which issued during the prosecution of Canadian Application No. 3,081,669.
An Office Action dated Mar. 17, 2023 which issued during the prosecution of U.S. Appl. No. 17/083,647.
An Office Action dated Mar. 2, 2023 which issued during the prosecution of Canadian Application No. 3,018,536.
An Office Action dated Mar. 27, 2023 which issued during the prosecution of Brazilian Application No. 122020 0177659.
An Office Action dated Mar. 27, 2023 which issued during the prosecution of U.S. Appl. No. 16/763,810.
An Office Action dated Mar. 3, 2022, which issued during the prosecution of U.S. Appl. No. 17/063,320.
An Office Action dated Mar. 3, 2023 which issued during the prosecution of U.S. Appl. No. 17/082,483.
An Office Action dated Mar. 7, 2023 which issued during the prosecution of Japanese Application No. JP 2021-157849.
An Office Action dated Nov. 25, 2022 which issued during the prosecution of U.S. Appl. No. 17/082,483.
Masafumi Onodera, "Organ Derangement", Medicina, Sep. 9, 2005, vol. 42, No. 9, pp. 1582-1584 (6 pages total).
Notice of Allowance issued for U.S. Appl. No. 16/088,321 on Apr. 12, 2023.
Olga V. Tyulina et al., "Erythrocyte and plasma protein modification in alcoholism: A possible role of acetaldehyde", Biochimica et Biophyisca, 2006, vol. 1762, pp. 558-563 (7 pages total).
Taihei Takakusaki, "Shape Change of Red Cell Ghost and ATP", The Kitakanto Medical Journal, 1960, vol. 10, Issue 4, pp. 522-531 (11 pages total).
Tetsuya Hirota et al., Kusanon A® Poisoning Complicated by Heinz Body Hemolytic Anemia, Japanese Association for Acute Medicine Magazine, vol. 12, No. 12, Dec. 15, 2001, pp. 749-754 (1 page total).
Notice of Allowance issued for U.S. Appl. No. 17/362,009 on Mar. 21, 2023.
An Office Action dated Jun. 8, 2023 which issued during the prosecution of Canadian Application No. 3,160,692.
An Office Action dated Jun. 9, 2023 which issued during the prosecution of Canadian Application No. 3,160,688.
An Office Action dated Jun. 22, 2023 which issued during the prosecution of Canadian Application No. 3,160,697.
An Office Action mailed on Jul. 3, 2023 which issued during the prosecution of U.S. Appl. No. 17/568,858.
An Office Action dated Jul. 12, 2023 which issued during the prosecution of Canadian Application No. 3,155,820.
An Office Action dated Jul. 17, 2023 which issued during the prosecution of Canadian Application No. 3,155,821.
Notice of Allowance issued for U.S. Appl. No. 16/763,810 on Feb. 8, 2024.
A Final Office Action dated Feb. 29, 2024 which issued during the prosecution of U.S. Appl. No. 17/083,647.
An Office Action dated Mar. 4, 2024 which issued during the prosecution of Canadian Application No. 3,022,770.
An Office Action dated Jan. 12, 2023 which issued during the prosecution of Canadian Application No. 3,022,770.
International Search Report and Written Opinion for PCT Application No. PCT/IB2023/062469 mailed on Mar. 11, 2024.
An Office Action dated Mar. 6, 2024 which issued during the prosecution of Canadian Application No. 3,160,688.
An Office Action dated Mar. 11, 2024 which issued during the prosecution of Canadian Application No. 3,160,692.
An Office Action dated Mar. 22, 2024 which issued during the prosecution of U.S. Appl. No. 17/360,503.
An Office Action dated Apr. 3, 2024 which issued during the prosecution of Canadian Application No. 3,160,697.
An Office Action dated Apr. 19, 2024 which issued during the prosecution of Canadian Application No. 3,155,820.
Examination Report dated Apr. 23, 2024 which issued during the prosecution of New Zealand Application No. 787743.
Examination Report dated Apr. 24, 2024 which issued during the prosecution of New Zealand Application No. 787745.
A European Examination Report dated Apr. 29, 2024. which issued during the prosecution of Application No. 20800326.9.
A European Examination Report dated May 6, 2024. which issued during the prosecution of Application No. 20800325.1.
A Restriction Requirement dated May 7, 2024 which issued during the prosecution of U.S. Appl. No. 17/770,339.
A European Examination Report dated May 8, 2024. which issued during the prosecution of Application No. 20828314.3.
Kerem Delikoyun, et al., "2 Deep learning-based cellular image analysis for intelligent medical diagnosis," Artificial Intelligence for Data-Driven Medical Diagnosis, De Gruyter, 2021, pp. 19-54 (4 pages total), https://www.degruyter.com/document/doi/10.1515/9783110668322-002/html.
Briggs, et al., "ICSH guidelines for the evaluation of blood cell analysers including those used for differential leuocyte and reticulocyte counting," International Journal of Laboratory Hematology. 2014, vol. 36, pp. 613-627 (15 pages total).
Office Action dated Feb. 1, 2024 which issued during the prosecution of U.S. Appl. No. 18/214,568.
Notice of Allowance issued for Canadian Application No. 3,155,821 on May 21, 2024.
An Office Action dated May 29, 2024 which issued during the prosecution of Korean Application No. 10-2022-7017082.
An Office Action dated May 29, 2024 which issued during the prosecution of Korean Application No. 10-2022-7017081.
Notice of Allowance dated May 31, 2024 which issued during the prosecution of U.S. Appl. No. 18/214,568.
A Chinese Office Action dated May 9, 2024 which issued during the prosecution of Application No. 202080085933.9.
An Office Action dated May 16, 2024 which issued during the prosecution of U.S. Appl. No. 17/063,320.
An Office Action dated Jul. 12, 2022, which issued during the prosecution of U.S. Appl. No. 16/088,321.
An Office Action dated Aug. 2, 2022, which issued during the prosecution of Japanese Patent Application No. 2021-145455.

(56) References Cited

OTHER PUBLICATIONS

An Examination Report dated Aug. 25, 2022, which issued during the prosecution of Australian Patent Application No. 2017263807.
An Office Action dated Aug. 30, 2022 which issued during the prosecution of Japanese Patent Application No. 2020-526176.
An Office Action dated Sep. 13, 2022 which issued during the prosecution of Japanese Patent Application No. 2021-157849.
Hideto Miura, "How to regard as how to consider the poikilocyte in urine an erroneous decision factor", Modern Medical Laboratory, Sep. 1, 2002, vol. 30, No. 9, pp. 862-864 (6 pages total).
Jun Hashimoto, "Morphological Studies of Urinary Red Blood Cells in Renal and Urinary Tract Disorders (II) Use of Wrights Stain in Differential Diagnosis between Renal and Urinary Tract Disorders" Kawasaki Medical Congress Magazine, Mar. 1989, vol. 15, No. 1, pp. 94-101 (9 pages total).
D F Birch et al., "The research on the differential diagnosis of the kidney urinary tract obstacle by glomerular or non-glomerular", Lancet, Oct. 20, 1979, vol. 2, No. 8147, pp. 845-846 (3 pages total).
A First Examination Report dated Sep. 19, 2022, which issued during the prosecution of Indian Patent Application No. 201817040226.
An Office Action dated Oct. 3, 2022 which issued during the prosecution of U.S. Appl. No. 16/763,810.
An Office Action dated Oct. 25, 2022 which issued during the prosecution of Canadian Application No. 2,998,829 (SDX044).
An Office Action dated Oct. 5, 2022 which issued during the prosecution of Brazilian Application No. 112018005099-7.
An Office Action dated Nov. 25, 2022 which issued during the prosecution of Brazilian Application No. 122020 017765-9.
An Office Action dated Dec. 9, 2022 which issued during the prosecution of U.S. Appl. No. 17/083,647.
An Office Action dated Dec. 28, 2022 which issued during the prosecution of Russian Patent Application No. 2022112399.
An Office Action dated Dec. 28, 2022 which issued during the prosecution of Russian Patent Application No. 2022112393.
An Office Action dated Jan. 6, 2023 which issued during the prosecution of U.S. Appl. No. 17/063,320.
An Office Action dated Sep. 2, 2022 which issued during the prosecution of U.S. Appl. No. 17/063,320.
An Office Action dated Jan. 5, 2023 which issued during the prosecution of Chinese Patent Application No. 201880079888.9.
An Examination Report dated Jan. 23, 2023, which issued during the prosecution of Australian Patent Application No. 2022200112.
An Office Action dated Jan. 19, 2023 which issued during the prosecution of U.S. Appl. No. 17/490,767.
An Office Action dated Nov. 10, 2022 which issued during the prosecution of U.S. Appl. No. 17/362,009.
Second Notice of Allowance dated Aug. 23, 2023 which issued during the prosecution of U.S. Appl. No. 17/490,767.
Notice of Allowance dated May 15, 2023 which issued during the prosecution of U.S. Appl. No. 17/490,767.
An Examination Report dated Aug. 16, 2023, which issued during the prosecution of Australian Patent Application No. 2018369859.
An Office Action dated Aug. 25, 2023 which issued during the prosecution of Canadian Application No. 3,160,702.
An Office Action dated May 30, 2023 which issued during the prosecution of U.S. Appl. No. 17/082,615.
A Hearing Notice issued by the Indian Patent Office on Aug. 29, 2023 for IN 201817012117.
A Hearing Notice issued by the Indian Patent Office on Sep. 1, 2023 for IN 201817036130.
An Office Action dated Sep. 14, 2023 which issued during the prosecution of U.S. Appl. No. 17/083,647.
An Office Action dated Sep. 14, 2023 which issued during the prosecution of U.S. Appl. No. 17/063,320.
Office Action dated Dec. 7, 2023 which issued during the prosecution of Canadian Application No. 3,081,669.
Notice of Allowance dated Jun. 22, 2023 which issued during the prosecution of U.S. Appl. No. 17/576,023.
A Summons to an Oral Hearing issued by the European Patent Office on Oct. 5, 2023 for Application No. 17728277.9.
A Decision to Refuse issued on Oct. 3, 2023 for Japanese Patent Application No. 2021-157849.
An Office Action dated Oct. 13, 2023 which issued during the prosecution of Canadian Application No. 2,998,829.
Notice of Allowance dated Oct. 12, 2023 which issued during the prosecution of U.S. Appl. No. 17/568,858.
An Office Action dated Oct. 17, 2023 which issued during the prosecution of U.S. Appl. No. 17/082,615.
A Hearing Notice issued by the Indian Patent Office on Nov. 9, 2023 for IN 201817040226.
An Office Action dated Dec. 19, 2023 which issued during the prosecution of Canadian Application No. 3,018,536.
An Office Action dated Dec. 21, 2023 which issued during the prosecution of Brazilian Application No. BR112018 072627 3.
An Office Action dated Jan. 9, 2024 which issued during the prosecution of U.S. Appl. No. 18/203,109.
"Blood specimens: Microscopic Examination", Centers for Disease Control and Prevention CDC, Diagnostic Procedures, 2009, <http://www.dpd.cdc.gov/dpdx/HTML/Frames/DiagnosticProcedures/body_dp_bloodexamin.htm>.
Agero, U., Mesquita, L.G., Neves, B.R.A., Gazzinelli, R.T. and Mesquita, O.N., 2004. Defocusing microscopy. Microscopy research and technique, 65(3), pp. 159-165.
Ahirwar, Neetu et al., "Advanced Image Analysis Based System for Automatic Detection and Classification of Malarial Parasite in Blood Images," International Journal of Information Technology and Knowledge Management Jan.-Jun. 2012, vol. 5, No. 1, pp. 59-64, Serial Publications Pvt. Ltd, India.
An International Search Report and a Written Opinion both dated Jan. 23, 2017. which issued during the prosecution of Applicant's PCT/IL2016/051025.
An International Search Report and Written Opinion in International Application No. PCT/IB2018/058861, issued on Apr. 8, 2019.
An International Search Report and Written Opinion, dated Aug. 30, 2017 from the International Bureau in counterpart International application No. PCT/IL2017/050526.
An International Search Report and Written Opinion, dated Aug. 8, 2017 from the International Bureau in counterpart International application No. PCT/IL2017/050523.
An International Search Report and Written Opinion, dated May 18, 2017 from the International Bureau in counterpart International application No. PCT/IL2017/050363.
Anand, A., et al. "Automatic Identification of Malaria-Infected RBC with Digital Holographic Microscopy Using Correlation Algorithms." Photonics Journal, IEEE 4.5 (2012): 1456-1464.
Bacus, J.W., 1985. Cytometric approaches to red blood cells. Pure and Applied AL Chemistry, 57(4), pp. 593-598.
Bieler, Sylvain et al. "Improved detection of Trypanosoma brucei by lysis of red blood cells, concentration and LED fluorescence microscopy"; Acta Tropica; vol. 121, Issue 2, Feb. 2012, pp. 135-140.
Bravo-Zanoguera, M.E., Laris, C.A., Nguyen, L.K., Oliva, M. and Price, J.H., 2007. Dynamic autofocus for continuous-scanning time-delay-and-integration image acquisition in automated microscopy. Journal of biomedical optics, 12(3), pp. 034011-034011.
Brenner et al., An Automated Microscope for Cytologic Research a Preliminary Evaluation, [The Journal of Histochecmistry and Cytochemistry, vol. 24, No. 1, pp. 100-111, 1976.
Briggs, C., et al., "Continuing developments with the automated platelet count", Blackwell Publishing Ltd, International Journal of Laboratory Hematology, Jan. 18, 2007, pp. 77-91, vol. 29 (15 pages total).
Centers for Disease Control and Prevention. DPDx—Laboratory Identification of Parasitic Diseases of Public Health Concern <http://www.cdc.gov/dpdx/diagnosticProcedures/blood/microexam.html>, Nov. 29, 2013.
Cervantes, Serena , Jacques Prudhomme, David Carter, Krishna G Gopi, Qian Li, Young-Tae Chang, and Karine G Le Roch, High-content live cell imaging with RNA probes: advancements in high-throughput antimalarial drug discovery, BMC Cell Biology 2009, 10:45, https://bmcmolcellbiol.biomedcentral.com/track/pdf/10.1186/1471-2121-10-45 (Jun. 10, 2009).

(56) References Cited

OTHER PUBLICATIONS

Chiodini, P.L. et al., "Rapid diagnosis of malaria by fluorescence microscopy"; The Lancet, vol. 337, Issue 8741, p. 624-625, Mar. 9, 1991.
Chong, Shau Poh, Shilpa Pant, and Nanguang Chen. "Line-scan Focal Modulation Microscopy for Rapid Imaging of Thick Biological Specimens." SPIE/OSA/IEEE Asia Communications and Photonics. International Society for Optics and Photonics, 2011.
Emma Eriksson et al: "Automated focusing of nuclei for time lapse experiments on single cells using holographic optical tweezers", Optics Express, vol. 17, No. 7, 2 Mar. 4, 2009, pp. 5585-5594.
F. Boray Tek et al. "Parasite detection and identification for automated thin blood film malaria diagnosis"; Computer Vision and Image Understanding vol. 114, Issue 1, Jan. 2010, pp. 21-32.
Fohlen-Walter, Anne PhD, et al., "Laboratory Identification of Cryoglobulinemia From Automated Blood Cell Counts, Fresh Blood Samples, and Blood Films", American Society for Clinical Pathology, Am J Clin Pathol, 2002, pp. 606-614, vol. 117 (9 pages total).
Frean, John. "Microscopic Determination of Malaria Parasite Load: Role of Image Analysis." Microscopy: Science, technology, Applications, and Education (2010): 862-866.
Gallo, V., Skorokhod, O.A., Schwarzer, e, AND Arese, P. "Simultaneous determination of phagocytosis of Plasmodium falciparum-parasitized and non-parasitized red blood cells by flow cytometry"; Malaria Journal 2012 11:428.
Garcia, et al. "Laboratory Diagnosis of Blood-borne Parasitic Diseases; Approved Guideline"; NCCLS Documents M115-a, Jun. 2000.
Gordon, Andrew et al. "Single-cell quantification of molecules" Nature Methods 4, Jan. 21, 2007, pp. 175-181.
Gordon, Andrew et al. Supplementary Note to Gordon et al: "Single-cell quantification of molecules" Nature Methods, Jan. 21, 2007, pp. 1-35.
Groen, F.C.A., et al. "A comparison of different focus functions for use in autofocus algorithms", Cytometry, Alan Liss, New York, US vol. 6, No. 2, Mar. 1, 1985 (Mar. 1, 1985) pp. 81-91.
Guy, Rebecca, Paul Liu, Peter Pennefather and Ian Crandall, "The use of fluorescence enhancement to improve the microscopic diagnosis of falciparum malaria", Malaria Journal 2007 6:89, https://malariajournal.biomedcentral.com/articles/10.1186/1475-2875-6-89, (Jul. 9, 2007).
Houri-Yafin, A., et al. "An enhanced computer vision platform for clinical diagnosis of malaria" Malaria Control and Elimination, 2016, p. 138, Vo. 5, Issue 1, omics International, India.
Jager et al. "Five-minute Giemsa stain for rapid detection of malaria parasites in blood smears", Tropical Doctor, Vo. 41, pp. 33-35, Jan. 2011.
Jahanmehr,S A H et al., "Simple Technique for Fluorescence Staining of Blood Cells with Acridine Orange", Journal of Clinical Pathology, Feb. 12, 1987, pp. 926-929 (4 pages total).
Joanny, Fanny, Helda Jana, and Benjamin Mordmllera, "In Vitro Activity of Fluorescent Dyes against Asexual Blood Stages of Plasmodium falciparum" DOI: 10.1128/AAC.00709-12.
Kawamoto, F. and P.F.Billingsley, "Rapid diagnosis of malaria by fluorescence microscopy", Parasitology Today, 8.2 (1992): 69-71.
Kawamoto,F. "Rapid diagnosis of malaria by fluorescence microscopy with light microscope and interference filter", The Lancet, vol. 337, pp. 200-202, Jan. 26, 1991.
Keiser, J. et al., "Acridine Orange for malaria diagnosis: its diagnostic performance, its promotion and implementation in Tanzania, and the implications for malaria control", Annals of Tropical Medicine and parasitology, 96.7 (2002): 643-654.
Knesel, "Roche Image Analysis Systems, Inc.", Acta Cytologica, vol. 40, pp. 60-66, (1996).
Kumar, Amit et al. "Enhanced Identification of Malarial Infected Objects using Otsu Algorithm from Thin Smear Digital Images." International Journal of Latest Research in Science and Technology vol. 1,Issue 2:pp. Nos. 159-163, Jul.-Aug. 2012.

Le, Minh-Tam et al., "A novel semi-automatic image processing approach to determine Plasmodium falciparum parasitemia in Giemsa-stained thin blood smears", BMC Cell Biology, published Mar. 28, 2008.
Leif, "Methods for Preparing Sorted Cells as Monolayer Specimens", Springer Lab Manuals, Section 7—Chapter 5 pp. 592-619, (2000).
Life Technologies Corporation, "Counting blood cells with Countless Automated Cell Counter" found at http://www.lifetechnologies.com/content/dam/Life Tech/migration/files/cell-tissue-analysis/pdfs.par.83996.file.dat/w-082149-countless-application-blood-cells.pdf, four pages, (2009).
Matcher, S.J., et al. "Use of the water absorption spectrum to quantify tissue chromophore concentration changes in near-infrared spectroscopy", Physics in Medicine & Biology, vol. 39, No. 1, 1994 pp. 177-196, IOP Publishing Ltd., UK.
Mendiratta, D.K. et al. Evaluation of different methods for diagnosis of P. falciparum malaria; Indian J Med Microbiol. Jan. 2006;24(1):49-51.
Merchant et al., "Computer-Assisted Microscopy", The essential guide to image processing, Chapter 27, pp. 777-831, Academic Press, (2009).
Moody, "Rapid Diagnostic Tests for Malaria Parasites", Clinical Microbiology Reviews, vol. 15, No. 1, pp. 66-78, 12 (2002).
Moon S, Lee S, Kim H, Freitas-Junior LH, Kang M, Ayong L, et al. (2013) An Image Analysis Algorithm for Malaria Parasite Stage Classification and Viability Quantification. PLoS One 8(4): e61812. https://doi.org/10.1371/journal.pone.0061812.
Ortyn, William E.,et al. "Extended Depth of Field Imaging for High Speed Cell Analysis." Cytometry Part A 71.4, 2007): 215-231.
Osibote, O. A., et al. "Automated focusing in bright-field microscopy for tuberculosis detection", Journal of Microscopy 240.2 (2010)pp. 155-163.
Pasini, Erica M. et al. "A novel live-dead staining methodology to study malaria parasite viability"; Malaria Journal 2013 12:190.
Piruska, Aigars et al., "The autofluorescence of plastic materials and chips measured under laser irradiation" Lab on a Chip, 2005, 5, 1348-1354, published Nov. 1, 2005.
Poon et al., "Automated Image Detection and Segmentation in Blood Smears", [Cytometry 1992 13:766-774].
Purwar, Yashasvi, et al. "Automated and Unsupervised Detection of Malarial Parasites in Microscopic Images." Malaria Journal 10.1 (2011): 364.
Rappaz, Benjamin et al., "Comparative study of human erythrocytes by digital holographic microscopy, confocal microscopy, and impedance volume analyzer" Cytometry Part A, 2008, vol. 73, Issue 10, pp. 895-903, John Wiley & Sons, US.
Roma, P. M. S., et al. "Total three-dimensional imaging of phase objects using defocusing microscopy: Application to red blood cells." Applied Physics Letters 104,25 (2014): 251107.
Ross, Nichoals E., et al., "Automated image processing method for the diagnosis and classification of malaria on thin blood smears", Medical and Biological Engineering and Computing, May 2006, vol. 44, Issue 5, pp. 427-436, Springer Publishing Company, US.
Sheikh, H., Bin Zhu, Micheli-Tzanakou, E. (1996) "Blood cell identification using neural networks." Proceedings of the IEEE 22nd Annual Northeast Bioengineering Conference; pp. 119-120.
Shen, Feimo, Louis Hodgson and Klaus Hahn, "Digital autofocus method for automated microscopy", Methods in Enzymology vol. 414, 2006, pp. 620-632.
Shute G. T. and T. M. Sodeman, "Identification of malaria parasites by fluorescence microscopy and acridine orange staining", Bulletin of the World Health Organ. 1973; 48(5): 591-596.
Sun, Yu, S. Duthaler and B.J. Nelson, "Autofocusing algorithm selection in computer microscopy", 2005 IEEE/RSJ International Conference on Intelligent Robots and Systems.
Tek, F. Boray, Andrew G. Dempster, and Izzet Kale. "Computer Vision for Microscopy Diagnosis of Malaria." Malaria Journal 8.1 (2009): 153.
Thung, Ferdian, and Iping Supriana Suwardi. "Blood Parasite Identification Using Feature Based Recognition." Electrical Engineering and Informatics (ICEEI), 2011 International Conference on. IEEE, 2011.

(56) References Cited

OTHER PUBLICATIONS

U.S. Appl. No. 61/427,809, filed Dec. 29, 2010. (CAT-1).
U.S. Appl. No. 61/870,106, filed Aug. 26, 2013. (CAT-2).
U.S. Appl. No. 62/042,388, filed Aug. 27, 2014 (CAT-2).
Unitaid Malaria Diagnostic Technology And Market Landscape, 2nd Edition (2014).
Wissing, Frank et al. "Illumination of the Malaria Parasite Plasmodium falciparum Alters Intracellular pH", Implications for Live Cell Imaging; published Jul. 24, 2002,JBS Papers in Press, vol. 277 No. 40, pp. 27747-37755.
Wright, J H. "A Rapid Method for the Differential Staining of Blood Films and Malarial Parasites" Journal of medical research vol. 7,1 (1902): 138-44.
Wu, Caicai et al., "Feasibility study of the spectroscopic measurement of oxyhemoglobin using whole blood without pre-treatment", The Analyst, Mar. 1998, pp. 477-481, vol. 123 (5 pages total).
Wu, Qiang, Fatima Mechant, and Kenneth Castleman. Microscope Image Processing. Chapter 16, Autofocusing, pp. 441-467, Academic Press, 2010.
Xu, Lili, Asok Chaudhuri, "Plasmodium yoelii: A differential fluorescent technique using Acridine Orange to identify infected erythrocytes and reticulocytes in Duffy knockout mouse", Experimental Parasitology, vol. 110, Issue 1, May 2005, pp. 80-87, https://www.sciencedirect.com/science/article/pii/S001448940500038X, (May 31, 2005).
Yang, Ming, and Li Luo. "A Rapid Auto-Focus Method in Automatic Microscope." Signal Processing, 2008. ICSP 2008. 9th International Conference on. IEEE,2008.
Yao, LN et al. "Pathogen identification and clinical diagnosis for one case infected with Babesia". Zhongguo ji sheng chong xue yu ji sheng chong bing za zhi Chinese journal of parasitology parasitic diseases, Aug. 2012.
Yazdanfar, S., Kenny, K.B., Tasimi, K., Corwin, A.D., Dixon, E.L. and Filkins, R.J., 2008. Simple and robust image-based autofocusing for digital microscopy. Optics express, 16(12), pp. 8670-8677.
Zahniser et al., Automated Slide Preparation System for the Clinical Laboratory, Cytometry, vol. 26, No. 10, pp. 60-64, (1996).
A European Examination Report dated Dec. 9, 2019. which issued during the prosecution of Applicant's European App No. 16782094.3.
Notice of Allowance dated Mar. 2, 2020, which issued during the prosecution of U.S. Appl. No. 16/657,473.
A European Examination Report dated Feb. 1, 2019. which issued during the prosecution of Applicant's European App No. 17717000.8.
A European Examination Report dated Sep. 3, 2019. which issued during the prosecution of Applicant's European App No. 17717000.8.
A European Examination Report dated Apr. 8, 2020. which issued during the prosecution of Applicant's European App No. 17717000.8.
A European Examination Report dated Apr. 6, 2020. which issued during the prosecution of Applicant's European App No. 17726036.1.
A European Examination Report dated Feb. 11, 2020. which issued during the prosecution of Applicant's European App No. 17728277.9.
An Office Action dated Aug. 24, 2020 for U.S. Appl. No. 16/098,893.
A Chinese Office Action and dated May 22, 2020. which issued during the prosecution of Chinese Application No. 201680053431.1.
A Restriction Requirement issued by the USPTO on Aug. 24, 2020 for U.S. Appl. No. 16/088,321.
Saraswat, et al. "Automated microscopic image analysis for leukocytes identification: A survey", ABV-Indian Institute of Information Technology and Management, Gwalior, India.
Hiremath, P.S,. et al., "Automated Identification and Classification of White Blood Cells (Leukocytes) in Digital Microscopic Images", IJCA Special Issue on "Recent Trends in Image Processing and Pattern Recognition" RTIPPR, 2010.

Witt, et al. "Establishing traceability of photometric absorbance values for accurate measurements of the haemoglobin concentration in blood.", Metrologia 50 (2013) 539-548.
Putzu, et al., "Leucocyte classification for leukaemia detection using image processing techniques.", Artificial Intelligence in Medicine, vol. 63, No. 3, Nov. 1, 2014.
Varga, et al., "An automated scoring procedure for the micronucleus test by image analysis,",Mutagenesis vol. 19 No. 5 pp. 391—397, 2004.
Ran, Qiong et al. "Spatial-spectral blood cell classification with microscopic hyperspectral imagery", Proc. SPIE 10461, AOPC 2017: Optical Spectroscopy and Imaging, 1046102 (Oct. 24, 2017).
Omucheni et al. "Application of principal component analysis to multispectral-multimodal optical image analysis for malaria diagnostics", Malaria Journal 2014, 13:485 http://www.malariajournal.com/content/13/1/485.
Ben-Suliman—2018—Computerized Counting-Based System for Acute Lymphoblastic Leukemia Detection in Microscopic Blood Images: 27th International Conference on Artificial Neural Networks, Rhodes, Greece, Oct. 4-7, 2018, Proceedings, Part II.
An Office Action dated Dec. 8, 2020 for Japanese Patent Application No. 2018/512961.
An Examination Report issued on Dec. 7, 2020 for Australian Patent Application No. 2016322966.
An Office Action dated Jan. 11, 2021 for U.S. Appl. No. 16/098,893.
An Examination Report issued on Apr. 29, 2021 for Australian Patent Application No. 2016322966.
International Search Report issued for PCT Application No. PCT/IB2020/059924 on Mar. 22, 2021.
International Search Report issued for PCT Application No. PCT/IB2020/059925 on Mar. 26, 2021.
Invitation to pay fees and Partial Search Report issued for PCT Application No. PCT/IB2020/059924 on Jan. 28, 2021.
Invitation to pay fees and Partial Search Report issued for PCT Application No. PCT/IB2020/059925 on Feb. 4, 2021.
A Japanese Office Action dated Mar. 30, 2021. which issued during the prosecution of Application No. 2018/558180.
An Office Action dated Mar. 9, 2021 for U.S. Appl. No. 16/088,321.
An Office Action dated Jan. 29, 2021 for U.S. Appl. No. 16/099,270.
Bovik, Alan C., et. "The Essential Guide to Image Processing", Chapter 27, "Computer Assisted Microscopy",pp. 777-831; Academic Press, 2009 (Merchant).
Communication dated Nov. 18, 2014 from the Canadian Patent Office in application No. 2,655,024.
Laboratory diagnosis of blood-borne parasitic diseases: approved guideline, 2000—NCCLS (CAT-1).
Price Jeffrey H. and David A. Gough, "Comparison of phase-contrast and fluorescence digital autofocus for scanning microscopy", Cytometry 16.4 (1994) 283-297.
Vink, J.P. et al., "An automatic vision-based malaria diagnosis system", Journal of Microscopy 250.3 (2013):166-178.
An International Search Report and Written Opinion for Application No. PCT/IB2020/061731 issued on Feb. 22, 2021.
Invitation to pay fees and Partial Search Report issued for PCT Application No. PCT/IB2020/061732 on Mar. 10, 2021.
Invitation to pay fees and Partial Search Report issued for PCT Application No. PCT/IB2020/061736 on Mar. 12, 2021.
Invitation to pay fees and Partial Search Report issued for PCT Application No. PCT/IB2020/061728 on Mar. 15, 2021.
International Search Report issued for PCT Application No. PCT/IB2020/061724 on Mar. 10, 2021.
An International Search Report and Written Opinion for PCT Application No. PCT/IB2020/061732 mailed on May 7, 2021.
International Search Report and Written Opinion for PCT Application No. PCT/IB2020/061728 mailed on May 7, 2021.
International Search Report and Written Opinion for PCT Application No. PCT/IB2020/061736 mailed on May 3, 2021.
Non-Final Office Action dated Jun. 17, 2021 which issued during the prosecution of U.S. Appl. No. 16/851,410.
A Final Office Action dated Jun. 17, 2021 which issued during the prosecution of U.S. Appl. No. 16/088,321.
Notice of Allowance dated May 19, 2021 which issued during the prosecution of U.S. Appl. No. 16/099,270.

(56) References Cited

OTHER PUBLICATIONS

A Restriction Requirement issued by the USPTO on Oct. 19, 2020 for U.S. Appl. No. 16/099,270.
An Extended European Search Report issued for European Patent Application No. 21164814.2 on Jun. 9, 2021.
Third Office Action dated Jul. 12, 2021 which issued during the prosecution of Chinese Patent Application No. 201680053431.1.
Non-Final Office Action dated Jul. 27, 2021, which issued during the prosecution of U.S. Appl. No. 16/851,686.
Non-Final Office Action dated Aug. 19, 2021, which issued during the prosecution of U.S. Appl. No. 16/098,893.
Non-Final Office Action dated Sep. 1, 2021 which issued during the prosecution of U.S. Appl. No. 16/088,321.
First Office Action dated Aug. 4, 2021 which issued during the prosecution of Chinese Patent Application No. 201780027908.3.
An Examination Report dated Mar. 4, 2021 which issued during the prosecution of Indian Patent Application No. 201817036130.
An Examination Report dated May 5, 2021 which issued during the prosecution of Indian Patent Application No. 201817012117.
Non-Final Office Action dated Oct. 6, 2021, which issued during the prosecution of U.S. Appl. No. 17/063,320.
Notice of Allowance dated Aug. 3, 2021, which issued during the prosecution of U.S. Appl. No. 16/851,410.
Notice of Allowance dated Nov. 5, 2021, which issued during the prosecution of U.S. Appl. No. 16/851,410.
Notice of Allowance dated Nov. 10, 2021, which issued during the prosecution of U.S. Appl. No. 16/851,686.
Supplemental Notice of Allowance dated Nov. 12, 2021, which issued during the prosecution of U.S. Appl. No. 16/851,686.
A European Examination Report issued for European Patent Application No. 17728277.9 on Dec. 23, 2021.
Notice of Allowance dated Jan. 21, 2022, which issued during the prosecution of U.S. Appl. No. 16/098,893.
An Office Action dated Feb. 16, 2022 which issued during the prosecution of U.S. Appl. No. 16/088,321.
An Office Action dated May 6, 2022 which issued during the prosecution of U.S. Appl. No. 16/763,810.
A Non-Final Office Action dated May 26, 2022 which issued during the prosecution of U.S. Appl. No. 17/083,775.
An Office Action dated May 31, 2022 which issued during the prosecution of U.S. Appl. No. 17/083,659.
Examination Report issued by the Indian Patent Office on Jun. 28, 2022 in Indian Patent Application No. 202047019700.
An International Search Report and a Written Opinion both dated Feb. 12, 2015, for International Application No. PCT/IL2014/050770.
An International Search Report and a Written Opinion both dated Jan. 15, 2016, for International Application No. PCT/IL2015/050864.
An International Search Report and a Written Opinion both dated Sep. 29 (24), 2014 for International Application No. PCT/IL2012/050423.
An Office Action dated Apr. 4, 2019 which issued during the prosecution of U.S. Appl. No. 14/914,329.
An Office Action dated Jun. 13, 2017. which issued during the prosecution of U.S. Appl. No. 14/285,672.
An Office Action dated Nov. 16, 2018 which issued during the prosecution of U.S. Appl. No. 14/914,329.
An Office Action dated Oct. 29, 2014, which issued during the prosecution of U.S. Appl. No. 13/338,291.
An Office Action dated Oct. 5, 2016, which issued during the prosecution of U.S. Appl. No. 14/285,672.
Notice of Allowance dated Jul. 10, 2019 in U.S. Appl. No. 15/506,997.
Notice of Allowance dated Mar. 20, 2019, which issued during the prosecution of U.S. Appl. No. 15/506,997.
A European Search Report dated Dec. 14, 2016 which issued during the prosecution of Applicant's European App No. 14800352.8.
A European Search Report dated Mar. 23, 2017. which issued during the prosecution of Applicant's European App No. 14839661.7.
An Office Action dated Mar. 26, 2018, which issued during the prosecution of U.S. Appl. No. 14/285,672.
A Final Office Action dated Jul. 29, 2019 which issued during the prosecution of U.S. Appl. No. 14/914,329.
A Chinese Office Action dated Dec. 19, 2019 for Chinese Application No. 201580058510.7.
A European Examination Report dated Jan. 7, 2020 which issued during the prosecution of Applicant's European App No. 15778059.4.
A European Examination Report dated Dec. 11, 2019 which issued during the prosecution of Applicant's European App No. 14800352.8.
An Indian Examination Report dated Apr. 22, 2020. which issued during the prosecution of Indian App No. 201617009399.
An Office Action dated Mar. 9, 2020 for U.S. Appl. No. 16/232,124.
An Advisory Action dated Dec. 27, 2019 for U.S. Appl. No. 14/914,329.
Panel Decision dated Mar. 2, 2020 for U.S. Appl. No. 14/914,329.
An Examination Report for Indian Application No. 201727008982 on Jan. 29, 2021.
An Office Action dated Jan. 19, 2021 for U.S. Appl. No. 16/706,159.
An Office Action dated Jun. 23, 2020 for U.S. Appl. No. 16/706,159.
A Notice of Allowance issued on May 13, 2021 for U.S. Appl. No. 16/592,335.
A Notice of Allowance issued on Jan. 27, 2021 for U.S. Appl. No. 16/592,335.
A Notice of Allowance issued on May 14, 2021 for U.S. Appl. No. 16/232,124.
Notice of Allowance dated Jun. 24, 2021 which issued during the prosecution of U.S. Appl. No. 16/232,124.
An Extended European Search Report issued for European Patent Application No. 21154596.7 on Jul. 23, 2021.
Non-Final Office Action dated Jun. 25, 2021 which issued during the prosecution of U.S. Appl. No. 16/706,159.
An International Search Report and a Written Opinion dated Sep. 17, 2021, for International Application No. PCT/IB2021/056073.
Hoover Karl "SimpleAutofocus.cpp—Micro-Manager Device Adapter Code", Dec. 31, 2009.
MetaXpress® 6 Software Guide, Configuring Image-Based Autofocus During Acquisition—2015.
D5-Micro-Manager—User's-Guide—Micro-Manager—2016.
MicroManager Documentation: SimpleAutofocus-2009.
A European Examination Report dated Dec. 10, 2021 which issued during the prosecution of Applicant's European App No. 15778059.4.
An Extended European Search Report issued for European Patent Application No. 21194040.8 on Jan. 18, 2022.
Bonnekoh et al., "Profiling lymphocyte subpopulations in peripheral blood under efalizumab treatment of psoriasis by multi epitope ligand cartography (MELC) robot microscopy", European Journal of Dermatology, vol. 16, No. 6, Nov. -Dec. 2006 (3 pages total), DOI: 10.1684/ejd.2006.0005.
Communication issued Feb. 27, 2025 in Chinese Application No. 202080085933.9.
Communication issued Jan. 27, 2025 in Chinese Application No. 202080085480.X.
Communication issued May 23, 2024 in Chinese Application No. 202080073583.4.
Communication issued May 23, 2024 in Chinese Application No. 202080073623.5.
Communication issued Nov. 25, 2024 in Chinese Application No. 202080073583.4.
Communication issued Nov. 25, 2024 in Chinese Application No. 202080073623.5.
Communication issued Sep. 11, 2024 in European Application No. 20828313.5.
Examination Report issued Jan. 23, 2025 in New Zealand Application No. 787745.
Communication issued Oct. 23, 2024 in European Application No. 20828312.7.
Examination Report issued Oct. 23, 2024 in New Zealand Application No. 787745.

(56) References Cited

OTHER PUBLICATIONS

Examination Report issued Oct. 31, 2024 in New Zealand Application No. 787743.
Office Action issued Dec. 19, 2024 in U.S. Appl. No. 17/063,320.
Office Action issued Dec. 30, 2024 in U.S. Appl. No. 17/083,647.
Office Action issued Mar. 11, 2025 in U.S. Appl. No. 18/376,680.
Haroon et al., "Hide and seek: hematological aspects of malaria—a developing country perspective", J Infect Dev Ctries, vol. 7, No. 3, 2013, pp. 273-279.
Horton et al., "Quantitative Immunophenotyping of Circulating Tumor Cells in Blood Using Microfluidic Screening Chip Integrated With Hyperspectral Microscope", Transducers, Jun. 21-25, 2009, pp. 77-80.
International Search Report with the Written Opinion of the International Searching Authority issued Sep. 2, 2024 in Application No. PCT/IB2024/054798.
Invitation to Pay Additional Fees issued Jul. 10, 2024 in Application No. PCT/IB2024/054798.
Communication issued Jan. 14, 2025 in Japanese Application No. 2024-015207.
Communication issued Jul. 1, 2024 in Japanese Application No. 2022-521112.
Communication issued Jul. 3, 2024 in Japanese Application No. 2022-521238.
Communication issued Nov. 5, 2024 in Japanese Application No. 2022-534369.
Communication issued Nov. 11, 2024 in Japanese Application No. 2022-521238.
Communication issued Nov. 7, 2024 in Japanese Application No. 2022-521112.
Niehues et al., "A classification based on T cell selection-related phenotypes identifies a subgroup of childhood T-ALL with favorable outcome in the CO ALL studies", Leukemia, vol. 13, 1999, pp. 614-617.
Office Action issued Jul. 8, 2024 in U.S. Appl. No. 18/397,324.
Office Action issued Sep. 28, 2024 in U.S. Appl. No. 17/770,339.
Notice of Allowance issued Aug. 7, 2024 in U.S. Appl. No. 17/783,924.
Notice of Allowance issued Mar. 8, 2024 in U.S. Appl. No. 17/082,615.
Notice of Allowance issued Jun. 13, 2024 in U.S. Appl. No. 18/203,109.
Notice of Allowance issued Sep. 23, 2024 in U.S. Appl. No. 18/203,109.
Novelli et al., "Clinical predictors of severe malarial anaemia in a holoendemic Plasmodium falciparum transmission area", British Journal of Haematology, vol. 149, 2010, pp. 711-721 (12 pages total).
Office Action issued Aug. 15, 2024 in U.S. Appl. No. 17/083,647.
Office Action issued Aug. 19, 2024 in U.S. Appl. No. 18/376,680.
Office Action issued Jan. 13, 2025 in U.S. Appl. No. 17/770,365.
Office Action issued Jan. 13, 2025 in U.S. Appl. No. 18/214,568.
Office Action issued Mar. 13, 2025 in U.S. Appl. No. 17/783,831.
Communication issued Mar. 5, 2025 in Japanese Application No. 2022-534230.
Communication issued Oct. 3, 2024 in Japanese Application No. 2022-534230.
Communication issued Oct. 7, 2024 in Japanese Application No. 2022-534229.
Communication issued Sep. 3, 2024 in Canadian Application No. 3,081,669.
Office Action issued Sep. 5, 2024 in U.S. Appl. No. 18/214,568.
Pan et al., "High-resolution and large field-of-view Fourier ptychographic microscopy and its applications in biomedicine", Reports on Progress in Physics, vol. 83, Aug. 18, 2020 (1 page total) DOI: 10.1088/1361-6633/aba6f0.
Thuma et al., "Distinct Clinical and Immunologic Profiles in Severe Malarial Anemia and Cerebral Malaria in Zambia", The Journal of Infectious Diseases, Jan. 2011, pp. 211-219 (10 pages total).
Rodrigo et al., "Fast control of temporal and spatial coherence properties of microscope illumination using DLP projector", Proceedings of SPIE—The International Society for Optical Engineering, vol. 9336, Mar. 2015, 93360F-1 (7 pages total), doi: 10.1117/12.2079059.
Invitation to Pay Additional Fees issued Feb. 25, 2025 in Application No. PCT/IB2024/062064.

\* cited by examiner

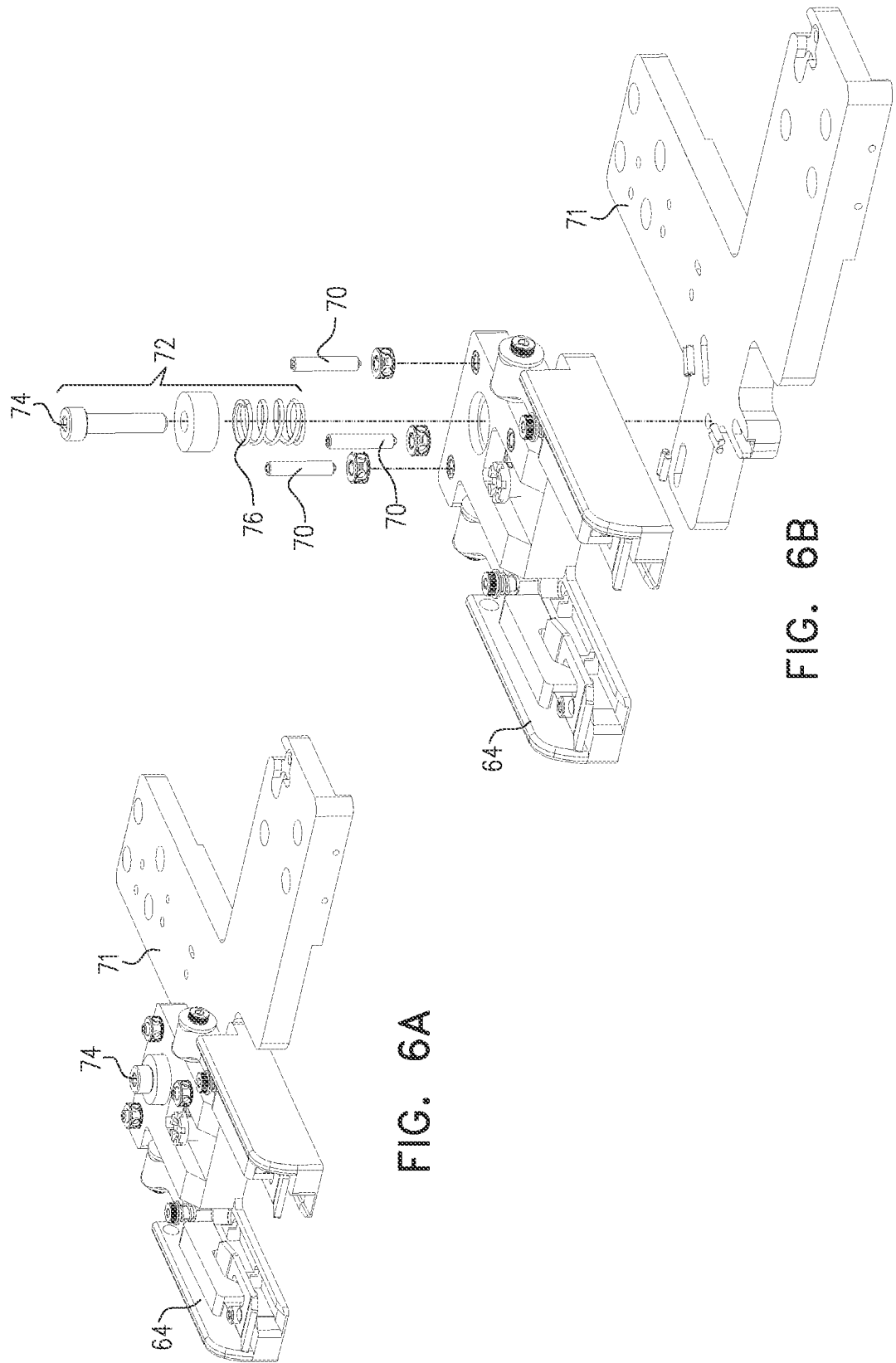

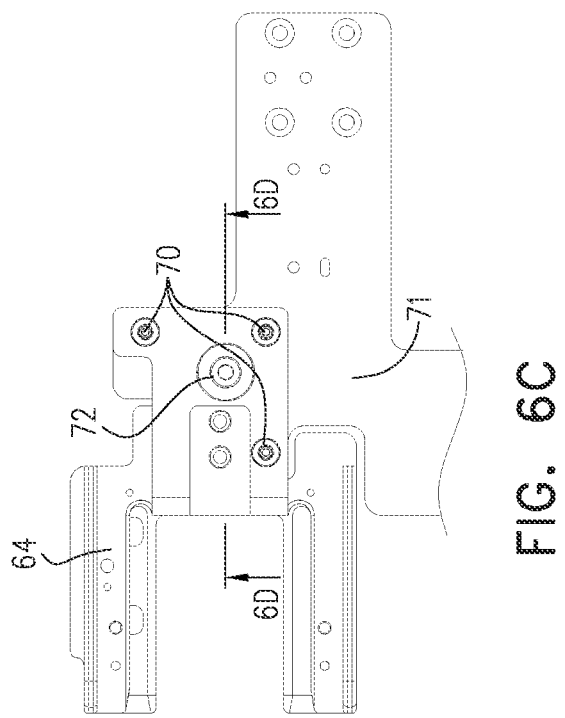
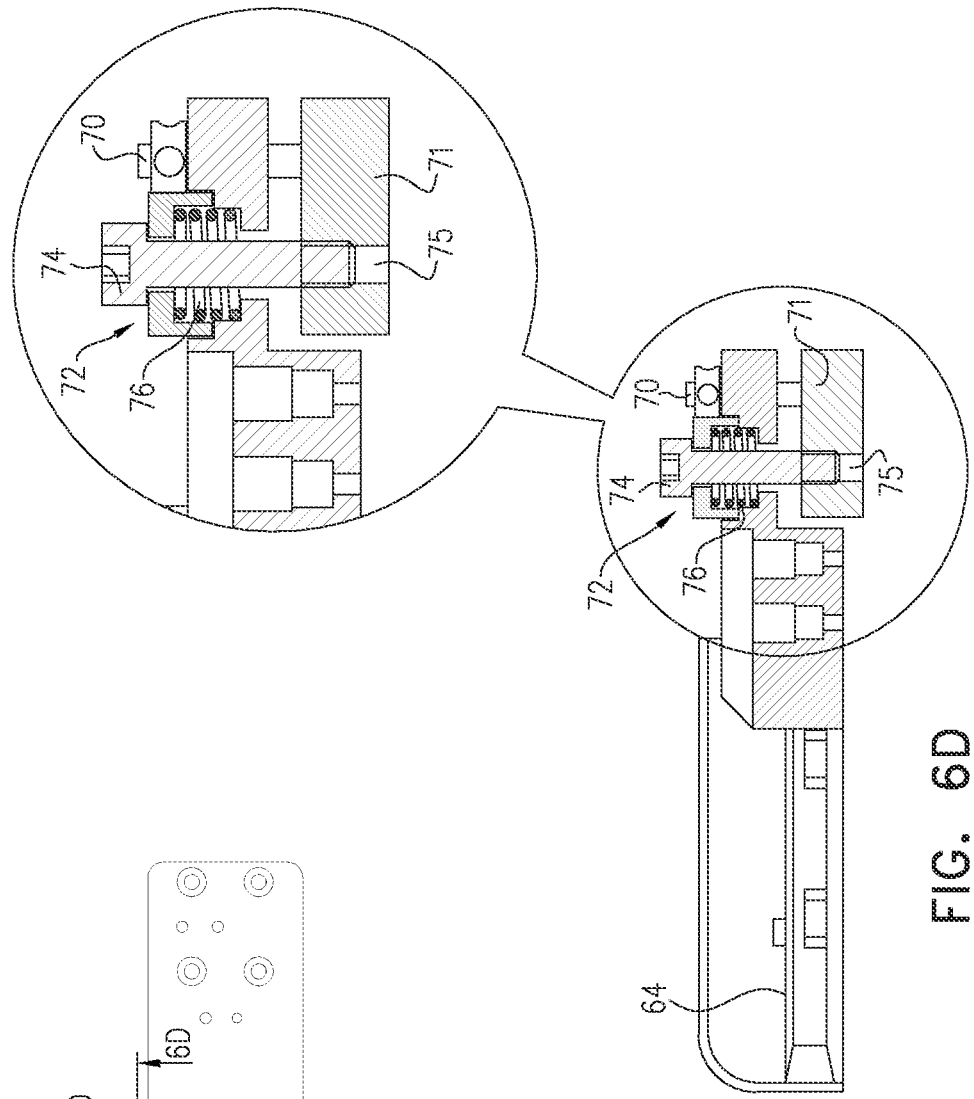
FIG. 6C
FIG. 6D

MICROSCOPY UNIT

CROSS-REFERENCE TO RELATED APPLICATIONS

The present application is a continuation of PCT/IB2020/061731 to Eshel (published as WO 21/116959), filed Dec. 10, 2020, entitled "Analyzing an analyte disposed within a medium," which claims priority from:
- U.S. Provisional Patent Application No. 62/946,986 to Eshel, filed Dec. 12, 2019, entitled "Analyzing an analyte disposed within a medium," and
- U.S. Provisional Patent Application No. 62/947,001 to Franklin, filed Dec. 12, 2019, entitled "Microscopy unit."

Both of the above-referenced US Provisional applications are incorporated herein by reference.

FIELD OF EMBODIMENTS OF THE INVENTION

Some applications of the presently disclosed subject matter relate generally to analysis of bodily samples, and, in particular, to optical density and microscopic measurements that are performed upon blood samples.

BACKGROUND

In some optics-based methods (e.g., diagnostic, and/or analytic methods), a property of a biological sample, such as a blood sample, is determined by performing an optical measurement. For example, the density of a component (e.g., a count of the component per unit volume) may be determined by counting the component within a microscopic image. Similarly, the concentration and/or density of a component may be measured by performing optical absorption, transmittance, fluorescence, and/or luminescence measurements upon the sample. Typically, the sample is placed into a sample carrier and the measurements are performed with respect to a portion of the sample that is contained within a sample chamber of the sample carrier. The measurements that are performed upon the portion of the sample that is contained within the sample chamber of the sample carrier are analyzed in order to determine a property of the sample.

SUMMARY OF EMBODIMENTS

In accordance with some applications of the present invention, apparatus and methods are provided for analyzing a bodily sample that is disposed within a sample chamber, the height of which is unknown. Typically, the sample contains an analyte disposed within a medium. For example, the sample may be a blood sample that includes hemoglobin (e.g., a plurality of variants of hemoglobin) disposed within water. Typically, the apparatus and methods described herein at least partially overcome uncertainty relating to the height of a sample chamber.

For some applications, in addition to measuring the absorption of the analyte (e.g., hemoglobin), the absorption of the medium in which the analyte is disposed is measured. Typically, wavelengths at which the absorption measurements are performed are selected, based upon the absorption profiles of, respectively, the analyte and the medium, as described in further detail hereinbelow. Assuming the analyte and the medium mass concentrations are $c_a$ and $c_s$ respectively, and their absorption coefficients as a function of wavelength ($\lambda$) are $\alpha_a(\lambda)$ and $\alpha_s(\lambda)$, respectively, then according to the Beer-Lambert law the transmitted light intensity at a given wavelength is provided as:

$$I = I_0 \times \exp[-l \times (\alpha_a(\lambda) \times c_a + \alpha_s(\lambda) \times c_s)],$$

where $I_0$ is the incident light intensity and $I$ is the length through the sample (corresponding to the height of the sample chamber).

Typically, the height of the sample chamber through which the light is transmitted in order to perform optical absorption or transmittance measurements is in the order of between 50 microns and 300 microns. However, it is typically the case that the exact height of the sample chamber is unknown. If the length through the sample is not known to high accuracy, then using absorption measurements at two wavelengths, one needs to solve for $l$, $c_a$ and $c_s$, which appear to be an undeterminable set of equations since there are three unknowns and only two equations. However, for some applications, it is assumed that the mass concentrations $c_a$ and $c_s$ are not independent. This is because, for an ideal mixture (in which the concentrations of components other than the analyte within the medium are assumed to be negligible), $c_a = \rho_a(1 - c_s/\rho_s)$, where $\rho_x$ is the mass density of the pure component.

Therefore, for some applications of the present invention, in a case in which the concentration of a single analyte that is dissolved within a solvent (or is mixed within a mixture) is to be determined, absorption measurements are performed at two wavelengths. Even though the precise height of the sample chamber in which the analyte is placed is not known, the Beer-Lambert equations are solved such as to determine the concentration of the analyte, by treating the concentration of the analyte as $c_a = \rho_a(1 - c_s/\rho_s)$.

For some applications, a generally similar technique is performed but the technique is modified such that the concentrations of two or more separate analytes that are within the medium are determined. For such applications, if there are n analytes the concentrations of which are to be determined, then n+1 absorption measurements are made at respective different wavelengths, and the corresponding equations are solved in order to determine the concentrations of the n analytes.

For some applications, the above-described techniques are used to determine the concentration of hemoglobin in blood. For some applications, the analyte includes a combination of variants of hemoglobin, for example, two or more of oxyhemoglobin, deoxyhemoglobin, methemoglobin, carboxyhemoglobin, etc. For some such applications, an isosbestic point in the absorption profiles of the two or more variants of hemoglobin is chosen as the wavelength for one of the two absorption measurements, and the computer processor determines an overall concentration of the two or more variants of hemoglobin by using that absorption measurement in combination with one additional absorption measurement.

Typically, for applications in which hemoglobin is the analyte (or a combination of variants of hemoglobin is the analyte), water is treated as the medium in which the hemoglobin is disposed, and the concentrations of components other than hemoglobin are assumed to be negligible. Typically, prior to performing such measurements, the red blood cells within the blood sample are lysed. For some applications, the hemoglobin is treated using a known method, such as modified azide-methemoglobin, cyanohemoglobin, SLS methods, etc., such that the variants of hemoglobin within the sample are transformed into a single compound. Typically, for such applications, a first absorption measurement is made at a wavelength band at which absorption of light by hemoglobin is relatively high, e.g., within the green or red portion of the visible spectrum. For example, a wavelength band that is centered around a wavelength of more than 500 nm and/or less than 650 nm (e.g., 500-650 nm) may be used for the first absorption measurement. For some applications, a wavelength band that is centered around a wavelength of approximately 505 nm (e.g., between 495 nm and 515 nm), and/or a wavelength of approximately 570 nm (e.g., between 560 nm and 580 nm), is used. Typically within this range of wavelengths, the absorption of hemoglobin is in the order of $10^4$ (1/m). Typically, the width of the wavelength band that is used for the first absorption measurement is between 1 nm and 10 nm.

For some applications, for the second absorption measurement, a range of wavelengths of light is used at which water has a similar level of absorption to that of hemoglobin within the range of wavelengths that is used for the first absorption measurement. Theoretically, this would be achievable by using light in the far UV range, but this is typically impractical. Therefore, typically, light within the mid-IR range is used for the second absorption measurement. For some applications, light with a wavelength band that is centered around a wavelength of greater than 1,200 nm and/or less than 3,000 nm (e.g., less than 1,600 nm), e.g., light with a wavelength band that is centered around a wavelength of 1,200 nm-3,000 nm, or 1,200 nm-1,600 nm, is used. Further typically, within this wavelength range, the second absorption measurement is performed at a local minimum or maximum in the absorption spectrum of water. For some applications, the second absorption measurement is performed at a wavelength band that is centered around a local maximum in the absorption spectrum of water, e.g., at approximately 1450 nm (e.g., 1440-1460 nm). Typically, the width of the wavelength band that is used for the second absorption measurement is between 1 nm and 50 nm.

For some applications of the present invention, a stage is configured to support a sample carrier within a microscopy unit. Typically the stage has a forked design, such that the sample carrier is supported around the edges of the sample carrier, but such that the stage itself does not interfere with the visibility of the sample chambers of the sample carrier by the optical measurement devices. For some applications, during an optical-measurement-unit-calibration phase, the stage is rotatable about the x and y axes of the of the microscope unit, and the orientation of the stage is calibrated such that the stage defines a plane that is perpendicular to the z-axis. (As used herein, the z-axis refers to the optical axis of the microscope unit and the x and y axes refer to two mutually-perpendicular axes within the plane that lies perpendicular to the z-axis.)

For some applications, three stage-leveling screws are coupled to (e.g., screwed into) a base plate in order to fix the orientation of the stage with respect to the z-axis. Optionally (not shown), additional stage-leveling screws are used. For some applications, the stage additionally includes a spring-screw component that includes a screw and a spring. Typically, during the optical-measurement-unit-calibration phase, the screw is not fastened with respect to the base plate. Further typically, in this configuration, the spring of the spring-screw component is not fully compressed, and the spring facilitates controlled movement of the stage with respect to the base plate. During the calibration of the orientation of the stage, the stage-leveling screws are screwed into the base plate in order to fix the orientation of the stage with respect to the z-axis. In some cases, subsequent to the optical-measurement-unit-calibration phase, and during the insertion of a sample carrier into the stage, one or more of the stage-leveling screws can become separated from the base plate (for example, in response to the sample carrier being pushed into the stage with undue force). Therefore, for some applications, once the calibration of the orientation of the stage has been completed, the screw of the spring-screw component is fastened with respect to the base plate, such that the screw fixes the stage in position with respect to the base plate (i.e., such that the spring no longer permits movement of the stage with respect to the base plate).

For some applications, a cantilever is configured to support an objective lens of a microscope above a camera of the microscope, and to control movement of the objective lens with respect to the camera. For some applications, the objective lens is an infinity-corrected objective lens. Typically, in order to correctly bring the sample into focus upon the microscope camera, the objective lens is moved along the z-axis. For some applications, a stepper motor is used to provide movement along the z-axis to the cantilever. Typically, the cantilever is configured to support the objective lens above the camera in a floating configuration. For some applications, during movement of the cantilever, the cantilever supports the objective lens such that the optical axis of the objective lens is aligned with the camera without the objective lens being directly connected to the camera. Typically, during movement of the cantilever, the cantilever supports the objective lens without the objective lens being disposed along a rail with respect to the camera, and/or without anything coming between the objective lens and the camera that would obscure the view that the camera has through the objective lens.

There is therefore provided, in accordance with some applications of the present invention, a method for use with a bodily sample that contains an analyte disposed within water, including:

placing the bodily sample within a sample chamber a height of which is unknown;

directing light through the sample at a first wavelength band, at which absorption of light by the analyte is relatively high;

directing light through the sample at a second wavelength band that is centered around a wavelength of between 1,200 nm and 3,000 nm;

detecting light that passes through the sample at each of the first and second wavelength bands;

based upon the detected light at each of the first and second wavelength bands determining a concentration of the analyte within the bodily sample, without directly measuring the height of the sample chamber.

In some applications, directing light through the sample at the second wavelength band includes directing light through the sample at a second wavelength band that is centered around a wavelength of between 1,200 nm and 1,600 nm.

In some applications, directing light through the sample at the second wavelength band includes directing light through the sample at a second wavelength band that is centered around a wavelength of between 1,440 nm and 1,460 nm.

In some applications, the method further includes directing light through the sample at a third wavelength band at which absorption of light by both the analyte and water is relatively low, detecting light that passes through the sample at the third wavelength band, and based upon the detected light that passes through the sample at the third wavelength band accounting for scatter by the sample.

In some applications, the method further including:
  based upon the detected light at the second wavelength band, determining the height of the sample chamber, and
  using the determined height of the sample chamber to determine additional parameters of the bodily sample.

In some applications, detecting light that passes through the sample at each of the first and second wavelength bands includes detecting light that passes through the sample at the second wavelength band using a detector selected from the group consisting of: a germanium-based detector, an In—Ga—Ar-based detector, and a combination thereof.

In some applications, the bodily sample includes a blood sample.

In some applications, determining a concentration of the analyte within the bodily sample includes determining a concentration of a combination of a plurality of variants of hemoglobin within the blood sample.

In some applications, directing light through the sample at the first wavelength band includes directing light through the sample at a first wavelength band that is centered around an isosbestic point of the plurality of variants of hemoglobin.

In some applications, the method further includes prior to directing light through the sample at the first wavelength band treating the blood sample such that the plurality of variants of hemoglobin within the blood sample are transformed into a single compound.

There is further provided, in accordance with some applications of the present invention, a method for use with a bodily sample that contains n analytes disposed within a medium, including:
  placing the bodily sample within a sample chamber the height of which is unknown;
  directing light through the sample at n wavelength bands, each of the n wavelength bands corresponding to a wavelength band at which absorption of light, by a respective one of the n analytes is relatively high;
  directing light through the sample at a further wavelength band at which absorption of light by the medium is relatively high;
  detecting light that passes through the sample at each of the wavelength bands;
  based upon the detected light at each of the wavelength bands determining a concentration of each of the n analytes within the bodily sample, without directly measuring the height of the sample chamber.

In some applications, the method further includes directing light through the sample at a still-further wavelength band at which absorption of light by both the medium and the n analytes is relatively low, detecting light that passes through the sample at the still-further wavelength band, and based upon the detected light that passes through the sample at the still-further wavelength band accounting for scatter by the sample.

In some applications, the method further including:
  based upon the detected light at the further wavelength band, determining the height of the sample chamber, and
  using the determined height of the sample chamber to determine additional parameters of the bodily sample.

In some applications, the bodily sample includes a blood sample, the medium includes water, and directing light through the sample at the further wavelength band includes directing light through the sample at a further wavelength band that is centered around a wavelength of between 1,200 nm and 3,000 nm.

In some applications, determining a concentration of each of the n analytes within the bodily sample includes determining a concentration of each of a plurality of variants of hemoglobin within the blood sample.

In some applications, directing light through the sample at the further wavelength band includes directing light through the sample at a further wavelength band that is centered around a wavelength of between 1,200 nm and 1,600 nm.

In some applications, directing light through the sample at the further wavelength band includes directing light through the sample at a further wavelength band that is centered around a wavelength of between 1,440 nm and 1,460 nm.

In some applications, detecting light that passes through the sample at each of the wavelength bands includes detecting light that passes through the sample at the further wavelength band using a detector selected from the group consisting of: a germanium-based detector, an In—Ga—Ar-based detector, and a combination thereof.

There is further provided, in accordance with some applications of the present invention, apparatus for use with a bodily sample that contains an analyte disposed within water, including:
  a sample chamber configured to receive the bodily sample, a height of the sample chamber being unknown;
  an optical-density-measurement unit including:
    one or more light sources configured to:
      direct light through the sample at a first wavelength band, at which absorption of light by the analyte is relatively high, and
      direct light through the sample at a second wavelength band that is centered around a wavelength of between 1,200 nm and 3,000 nm; and
    one or more light detectors configured to detect light that passes through the sample at each of the first and second wavelength bands; and
  at least one computer processor configured, based upon the detected light at each of the first and second wavelength bands, to determine a concentration of the analyte within the bodily sample, without directly measuring the height of the sample chamber.

In some applications, the one or more light sources are further configured to direct light through the sample at a third wavelength band at which absorption of light by both the analyte and water is relatively low, the one or more light detectors are further configured to detect light that passes through the sample at the third wavelength band, and, based upon the detected light that passes through the sample at the third wavelength band, the computer processor is configured to account for scatter by the sample.

In some applications, the computer processor is configured:
  based upon the detected light at the second wavelength band, to determine the height of the sample chamber, and
  using the determined height of the sample chamber, to determine additional parameters of the bodily sample.

In some applications, the one or more light detectors include one or more light detectors that are configured to detect light that passes through the sample at the second wavelength band selected from the group consisting of: a germanium-based detector, an In—Ga—Ar-based detector, and a combination thereof.

In some applications, the one or more light sources are configured to direct light through the sample at a second wavelength band that is centered around a wavelength of between 1,200 nm and 1,600 nm.

In some applications, the one or more light sources are configured to direct light through the sample at a second wavelength band that is centered around a wavelength of between 1,440 nm and 1,460 nm.

In some applications, the apparatus is for use with a blood sample.

In some applications, the computer processor is configured to determine a concentration of a combination of a plurality of variants of hemoglobin within the blood sample.

In some applications, the one or more light sources are configured to direct light through the sample at a first wavelength band that is centered around an isosbestic point of the plurality of variants of hemoglobin.

There is further provided, in accordance with some applications of the present invention, apparatus for use with a bodily sample that contains n analytes disposed within a medium, including:
  a sample chamber configured to receive the bodily sample, a height of the sample chamber being unknown;
  an optical-density-measurement unit including:
    one or more light sources configured to:
      direct light through the sample at n wavelength bands, each of the n wavelength bands corresponding to a wavelength band at which absorption of light, by a respective one of the n analytes is relatively high, and
      direct light through the sample at a further wavelength band at which absorption of light by the medium is relatively high; and
    one or more light detectors configured to detect light that passes through the sample at each of the wavelength bands; and
  at least one computer processor configured, based upon the detected light at each of the wavelength bands, to determine a concentration of each of the n analytes within the bodily sample, without directly measuring the height of the sample chamber.

In some applications, the one or more light sources are configured to direct light through the sample at a still-further wavelength band at which absorption of light by both the medium and the n analytes is relatively low, the one or more light detectors are further configured to detect light that passes through the sample at the still-further wavelength band, and, based upon the detected light that passes through the sample at the still-further wavelength band, the computer processor is configured to account for scatter by the sample.

In some applications, the computer processor is configured:
  based upon the detected light at the further wavelength band, to determine the height of the sample chamber, and
  using the determined height of the sample chamber, to determine additional parameters of the bodily sample.

In some applications, the apparatus is for use with a blood sample, the medium includes water, and the one or more light sources are configured to direct light through the sample at the further wavelength band by directing light through the sample at a further wavelength band that is centered around a wavelength of between 1,200 nm and 3,000 nm.

In some applications, the computer processor is configured to determine a concentration of each of a plurality of variants of hemoglobin within the blood sample.

In some applications, the one or more light sources are configured to direct light through the sample at the further wavelength band by directing light through the sample at a further wavelength band that is centered around a wavelength of between 1,200 nm and 1,600 nm.

In some applications, the one or more light sources are configured to direct light through the sample at the further wavelength band by directing light through the sample at a further wavelength band that is centered around a wavelength of between 1,440 nm and 1,460 nm.

In some applications, the one or more light detectors include one or more light detectors that are configured to detect light that passes through the sample at the further wavelength band selected from the group consisting of: a germanium-based detector, an In—Ga—Ar-based detector, and a combination thereof.

There is further provided, in accordance with some applications of the present invention, a method for use with a bodily sample that contains an analyte disposed within a medium, including:
  placing the bodily sample within a sample chamber the height of which is unknown;
  directing light through the sample at a first wavelength band, at which absorption of light by the analyte is relatively high;
  directing light through the sample at a second wavelength band at which absorption of light by the medium is relatively high;
  detecting light that passes through the sample at each of the first and second wavelength bands;
  based upon the detected light at each of the first and second wavelength bands determining a concentration of the analyte within the bodily sample, without directly measuring the height of the sample chamber.

For some applications, the method further includes directing light through the sample at a third wavelength band at which absorption of light by both the medium and the analyte is relatively low, detecting light that passes through the sample at the third wavelength band, and based upon the detected light that passes through the sample at the third wavelength band accounting for scatter by the sample.

For some applications, the method further includes:
  based upon the detected light at the second wavelength band, determining the height of the sample chamber, and
  using the determined height of the sample chamber to determine additional parameters of the bodily sample.

For some applications, the bodily sample includes a blood sample, the medium includes water, and directing light through the sample at the second wavelength band includes directing light through the sample at a second wavelength band that is centered around a wavelength of between 1,200 nm and 3,000 nm.

For some applications, directing light through the sample at the second wavelength band includes directing light through the sample at a second wavelength band that is centered around a wavelength of between 1,200 nm and 1,600 nm.

For some applications, directing light through the sample at the second wavelength band includes directing light through the sample at a second wavelength band that is centered around a wavelength of between 1,440 nm and 1,460 nm.

For some applications, detecting light that passes through the sample at each of the first and second wavelength bands includes detecting light that passes through the sample at the second wavelength band using a detector selected from the group consisting of: a germanium-based detector, an In—Ga—Ar-based detector, and a combination thereof.

For some applications, determining a concentration of the analyte within the bodily sample includes determining a concentration of a combination of a plurality of variants of hemoglobin within the blood sample.

For some applications, directing light through the sample at the first wavelength band includes directing light through the sample at a first wavelength band that is centered around an isosbestic point of the plurality of variants of hemoglobin.

For some applications, the method further includes, prior to directing light through the sample at the first wavelength band, treating the blood sample such that the plurality of variants of hemoglobin within the blood sample are transformed into a single compound.

There is further provided in accordance with some applications of the present invention, apparatus for use with a microscopy unit that comprises an objective lens, the apparatus comprising:
- a stage configured to support a sample carrier within the microscopy unit, the stage being configured to be moveable, during an optical-measurement-unit-calibration phase, such that an orientation of the stage can be adjusted with respect to an optical axis of the objective lens;
- a base plate;
- three or more stage-leveling screws configured to fix an orientation of the stage with respect to the optical axis of the objective lens, by the stage-leveling screws being coupled to the base plate; and
- at least one spring-screw component comprising a spring and a screw, the spring-screw component being configured:
  - to facilitate controlled movement of the stage with respect to base plate, during the optical-measurement-unit-calibration phase; and
  - subsequent to the orientation of the stage having been calibrated with respect to the optical axis of the objective lens, to fix the stage in position with respect to the base plate, by the screw of the spring-screw component being fastened with respect to the base plate.

There is further provided, in accordance with some applications of the present invention apparatus for use with a microscopy unit that comprises an objective lens and a microscope camera, the apparatus comprising:
- a cantilever;
- a stepper motor configured to move the cantilever along a direction of the optical axis of the objective lens;
- the cantilever comprising an objective lens housing, and the cantilever being configured, during the movement of the cantilever, to support the objective lens within the objective lens housing such that an optical axis of the objective lens is aligned with the camera, without the objective lens being directly connected to the camera.

The present invention will be more fully understood from the following detailed description of embodiments thereof, taken together with the drawings, in which:

BRIEF DESCRIPTION OF THE DRAWINGS

FIGS. 6A, 6B, 6C, and 6D are schematic illustrations of a sample-carrier stage of an optical measurement device, in accordance with some applications of the present invention.

DETAILED DESCRIPTION OF EMBODIMENTS

Figure 1:
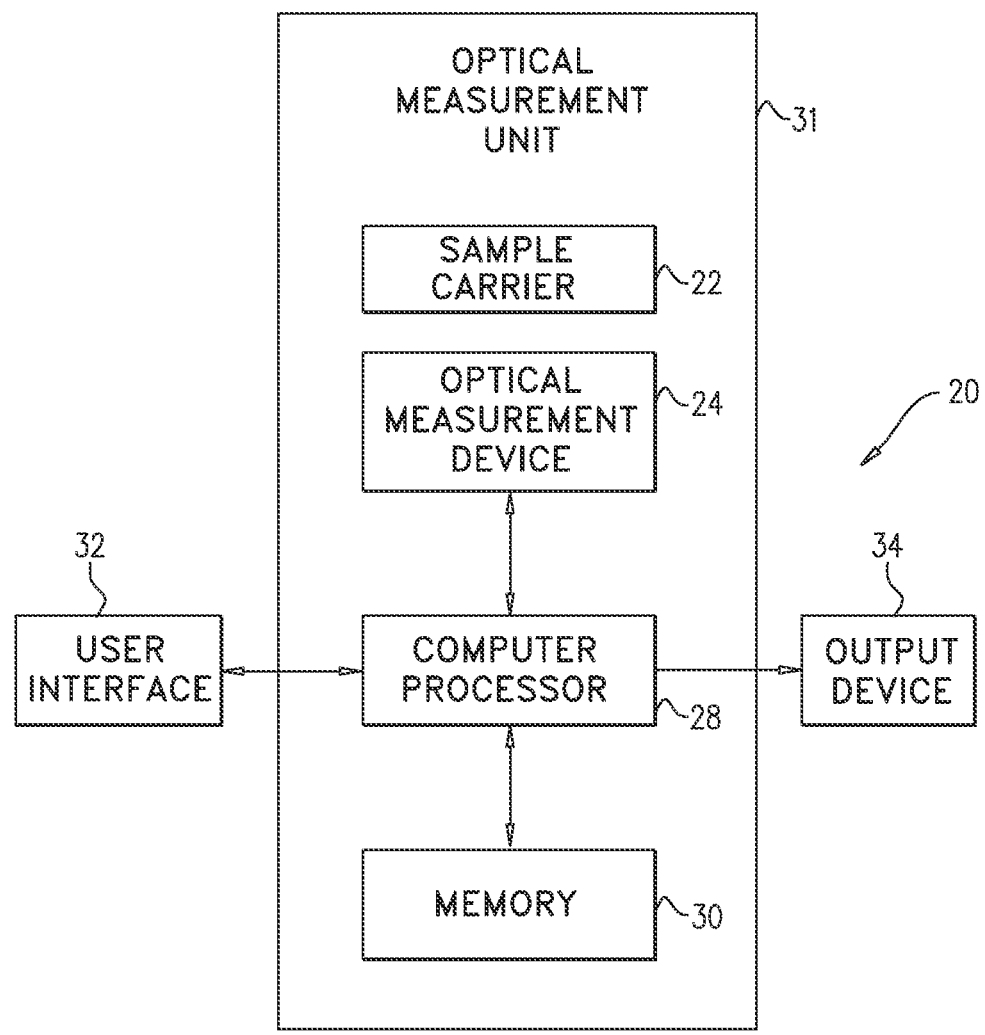
FIG. 1 is a block diagram showing components of a biological sample analysis system, in accordance some applications of the present invention.

Reference is now made to FIG. 1, which is block diagram showing components of a biological sample analysis system 20, in accordance with some applications of the present invention. Typically, a biological sample (e.g., bodily sample, such as a blood sample) is placed into a sample carrier 22. While the sample is disposed in the sample carrier, optical measurements are performed upon the sample using one or more optical measurement devices 24. For example, the optical measurement devices may include a microscope (e.g., a digital microscope), a spectrophotometer, a photometer, a spectrometer, a camera, a spectral camera, a hyperspectral camera, a fluorometer, a spectrofluorometer, and/or a photodetector (such as a photodiode, a photoresistor, and/or a phototransistor). For some applications, the optical measurement devices include dedicated light sources (such as light emitting diodes, incandescent light sources, etc.) and/or optical elements for manipulating light collection and/or light emission (such as lenses, diffusers, filters, etc.).

A computer processor 28 typically receives and processes optical measurements that are performed by the optical measurement device. Further typically, the computer processor controls the acquisition of optical measurements that are performed by the one or more optical measurement devices. The computer processor communicates with a memory 30. A user (e.g., a laboratory technician, or an individual from whom the sample was drawn) sends instructions to the computer processor via a user interface 32. For some applications, the user interface includes a keyboard, a mouse, a joystick, a touchscreen device (such as a smartphone or a tablet computer), a touchpad, a trackball, a voice-command interface, and/or other types of user interfaces that are known in the art. Typically, the computer processor generates an output via an output device 34. Further typically, the output device includes a display, such as a monitor, and the output includes an output that is displayed on the display. For some applications, the processor generates an output on a different type of visual, text, graphics, tactile, audio, and/or video output device, e.g., speakers, headphones, a smartphone, or a tablet computer. For some applications, user interface 32 acts as both an input interface and an output interface, i.e., it acts as an input/output interface. For some applications, the processor generates an output on a computer-readable medium (e.g., a non-transitory computer-readable medium), such as a disk, or a portable USB drive, and/or generates an output on a printer.

Figure 2A:
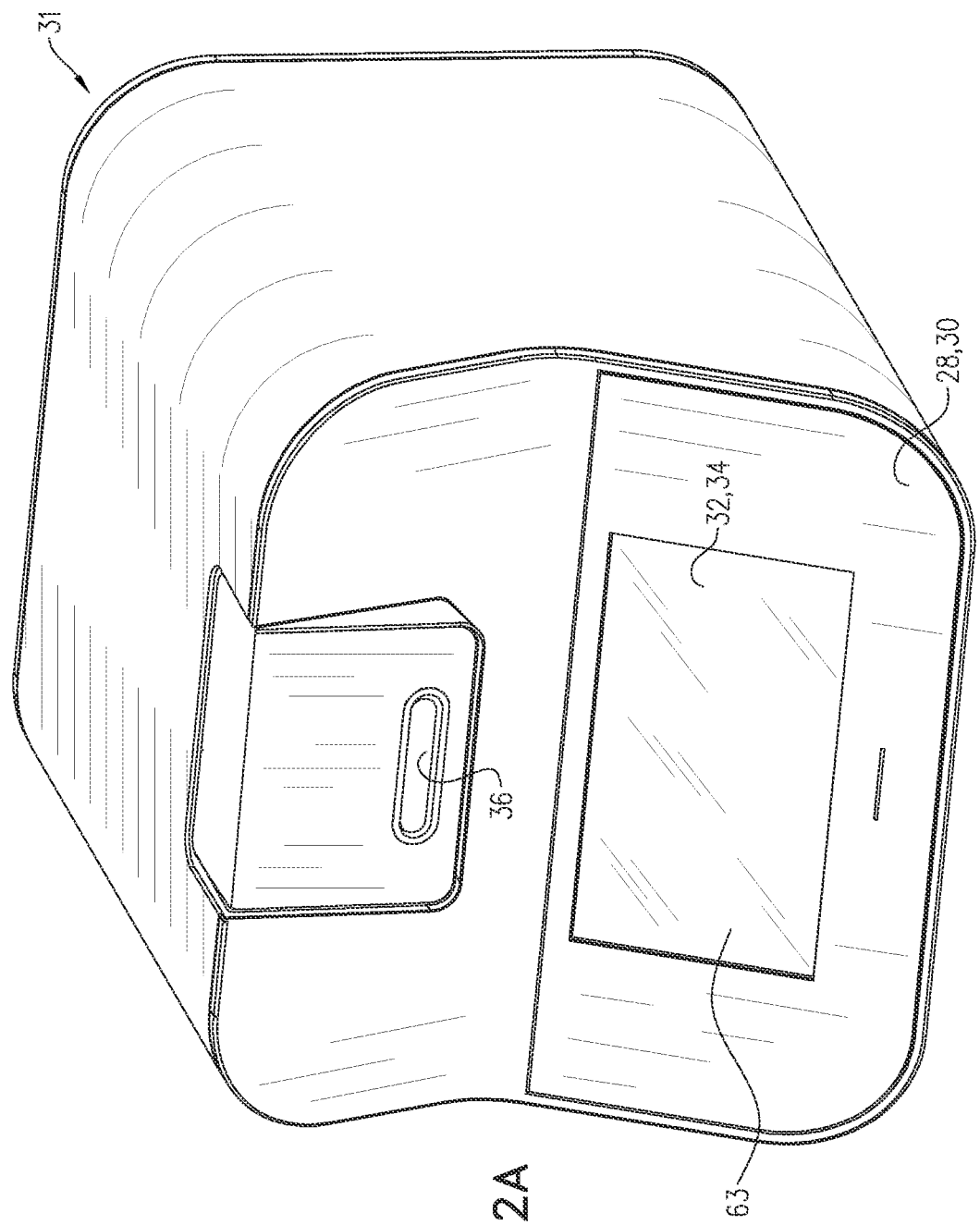
FIGS. 2A, 2B, and 2C are schematic illustrations of an optical measurement unit, in accordance with some applications of the present invention.
Figure 2B:
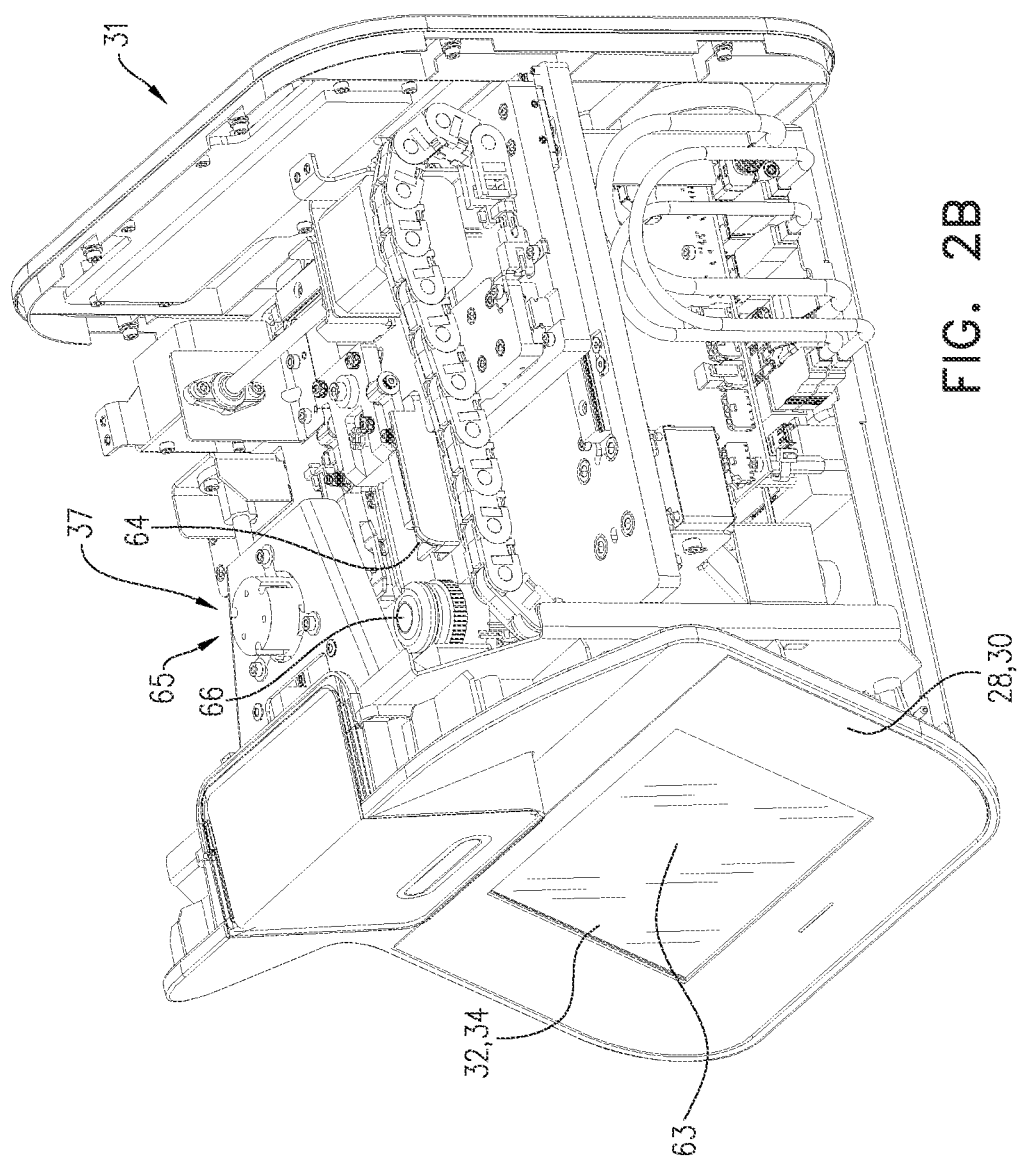
Figure 2C:
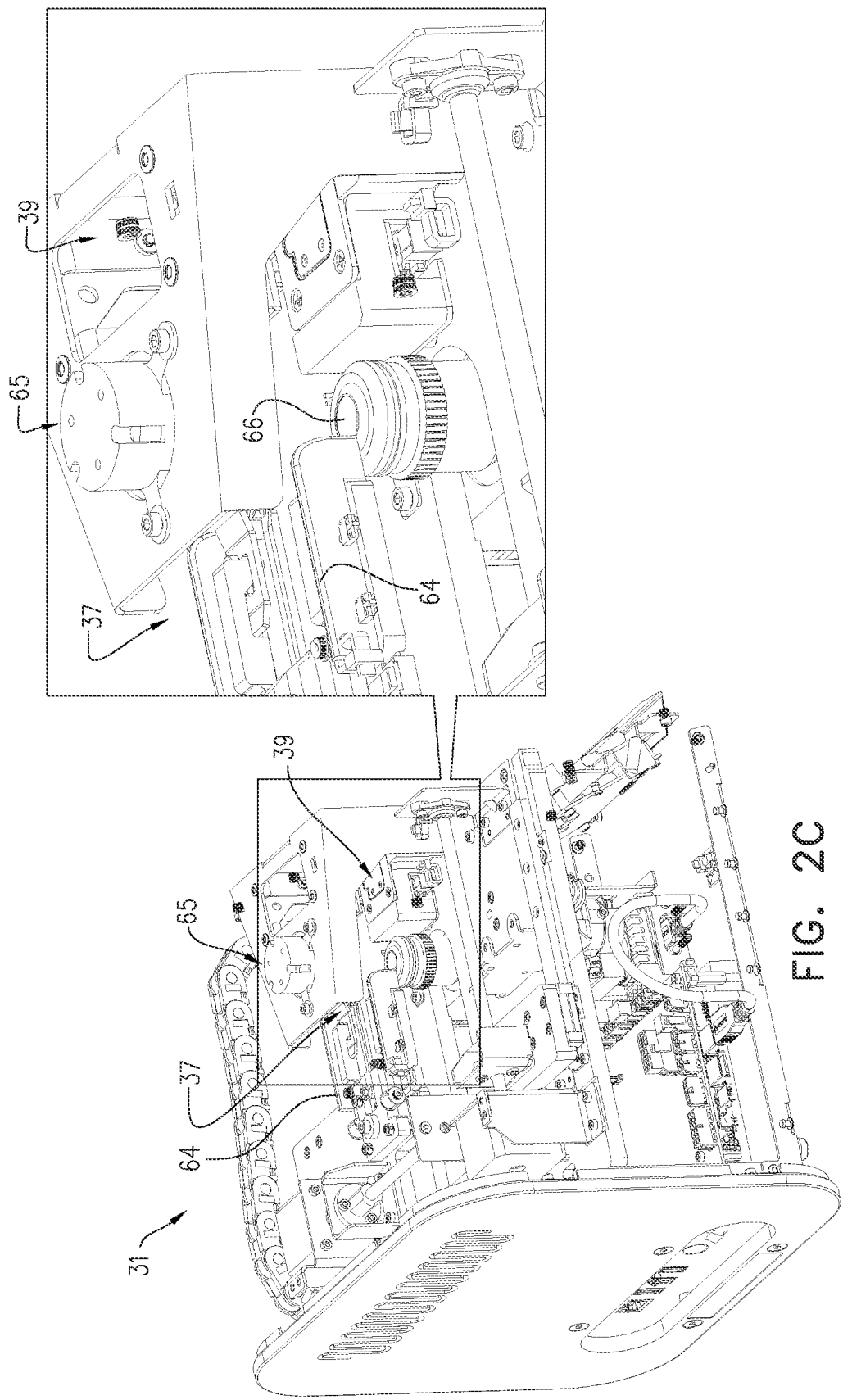

Reference is now made to FIGS. 2A, 2B, and 2C, which are schematic illustrations of an optical measurement unit 31, in accordance with some applications of the present invention. FIG. 2A shows an oblique view of the exterior of the fully assembled device, while FIGS. 2B and 2C shows respective oblique views of the device with the cover having been made transparent, such components within the device are visible. For some applications, one or more optical measurement devices 24 (and/or computer processor 28 and memory 30) is housed inside optical measurement unit 31. In order to perform the optical measurements upon the sample, sample carrier 22 is placed inside the optical measurement unit. For example, the optical measurement unit may define a slot 36, via which the sample carrier is inserted into the optical measurement unit. For some applications, a screen 63 on the cover of the optical measurement unit (e.g., a screen on the front cover of the optical measurement unit, as shown) functions as user interface 32 and/or output device 34.

Typically, the optical measurement unit includes microscope system 37 (shown in FIGS. 2B-C) configured to perform microscopic imaging of a portion of the sample. For some applications, the microscope system includes a set of light sources 65 (which typically include a set of brightfield light sources (e.g. light emitting diodes) that are configured to be used for brightfield imaging of the sample, a set of fluorescent light sources (e.g. light emitting diodes) that are configured to be used for fluorescent imaging of the sample), and a camera (e.g., a CCD camera, or a CMOS camera) configured to image the sample. Typically, the optical measurement unit also includes an optical-density-measurement unit 39 (shown in FIG. 2C) configured to perform optical density measurements (e.g., optical absorption measurements) on a second portion of the sample. For some applications, the optical-density-measurement unit includes a set of optical-density-measurement light sources 61 (e.g., light emitting diodes, shown in FIG. 4) and light detectors 69 (FIG. 4), which are configured for performing optical density measurements on the sample. For some applications, each of the aforementioned sets of light sources (i.e., the set of brightfield light sources, the set of fluorescent light sources, and the set optical-density-measurement light sources) includes a plurality of light sources (e.g. a plurality of light emitting diodes), each of which is configured to emit light at a respective wavelength or at a respective band of wavelengths.

Figure 3A:
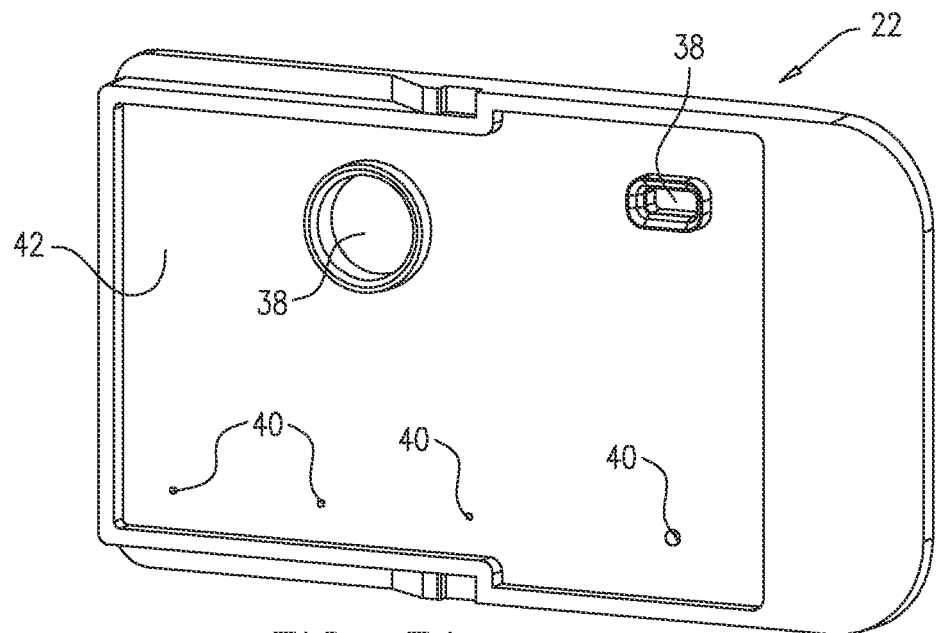
FIGS. 3A, 3B, and 3C are schematic illustrations of respective views of a sample carrier that is used for performing both microscopic measurements and optical density measurements, in accordance with some applications of the present invention.
Figure 3B:
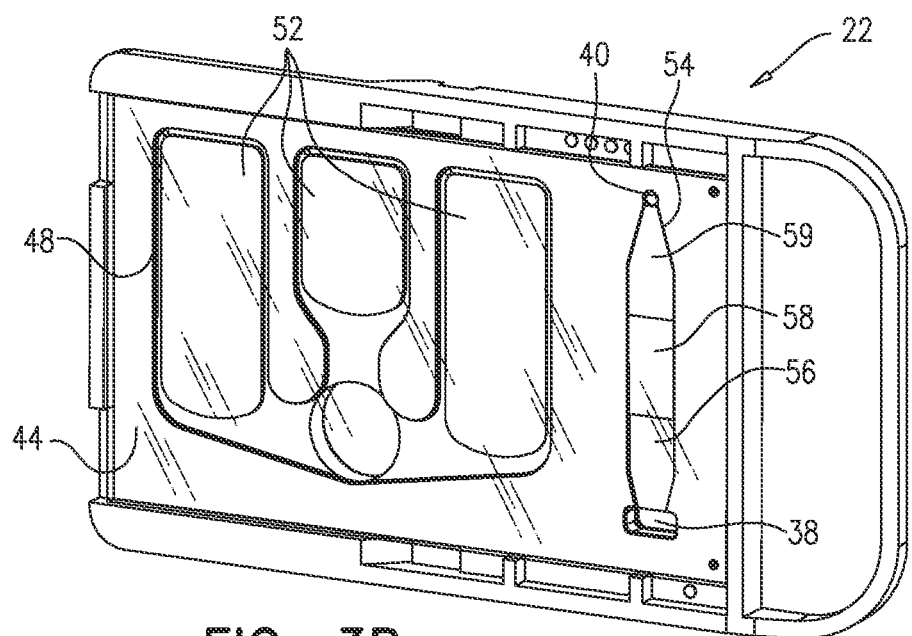

Reference is now made to FIGS. 3A and 3B, which are schematic illustrations of respective views of sample carrier 22, in accordance with some applications of the present invention. FIG. 3A shows a top view of the sample carrier (the top cover of the sample carrier being shown as being opaque in FIG. 3A, for illustrative purposes), and FIG. 3B shows a bottom view (in which the sample carrier has been rotated around its short edge with respect to the view shown in FIG. 3A). Typically, the sample carrier includes a first set 52 of one or more sample chambers, which are used for performing microscopic analysis upon the sample, and a second set 54 of sample chambers, which are used for performing optical density measurements upon the sample. Typically, the sample chambers of the sample carrier are filled with a bodily sample, such as blood, via sample inlet holes 38. For some applications, the sample chambers define one or more outlet holes 40. The outlet holes are configured to facilitate filling of the sample chambers with the bodily sample, by allowing air that is present in the sample chambers to be released from the sample chambers. Typically, as shown, the outlet holes are located longitudinally opposite the inlet holes (with respect to a sample chamber of the sample carrier). For some applications, the outlet holes thus provide a more efficient mechanism of air escape than if the outlet holes were to be disposed closer to the inlet holes.

Figure 3C:
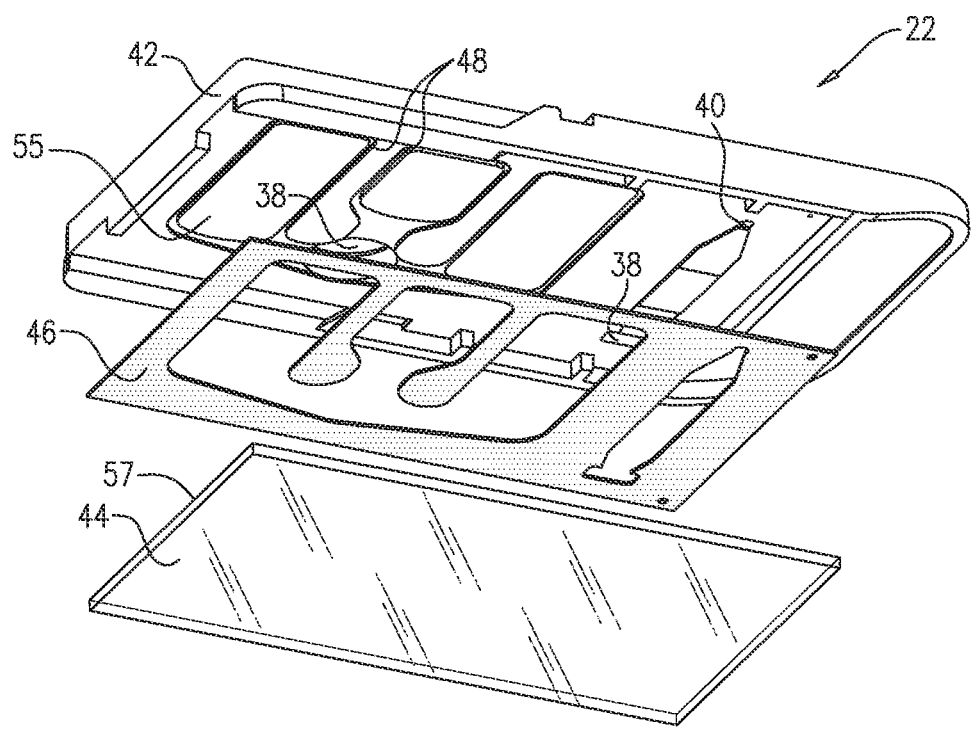

Reference is made to FIG. 3C, which shows an exploded view of sample carrier 22, in accordance with some applications of the present invention. For some applications, the sample carrier includes at least three components: a molded component 42, a glass layer 44 (e.g., a glass sheet), and an adhesive layer 46 configured to adhere the glass layer to an underside of the molded component. The molded component is typically made of a polymer (e.g., a plastic) that is molded (e.g., via injection molding) to provide the sample chambers with a desired geometrical shape. For example, as shown, the molded component is typically molded to define inlet holes 38, outlet holes 40, and gutters 48 which surround the central portion of each of the sample chambers. The gutters typically facilitate filling of the sample chambers with the bodily sample, by allowing air to flow to the outlet holes, and/or by allowing the bodily sample to flow around the central portion of the sample chamber.

For some applications, a sample carrier as shown in FIGS. 3A-C is used when performing a complete blood count on a blood sample. For some such applications, the sample carrier is used with optical measurement unit 31 configured as generally shown and described with reference to FIGS. 2A-C. For some applications, a first portion of the blood sample is placed inside first set 52 of sample chambers (which are used for performing microscopic analysis upon the sample, e.g., using microscope system 37 (shown in FIGS. 2B-C)), and a second portion of the blood sample is placed inside second set 54 of sample chambers (which are used for performing optical density measurements upon the sample, e.g., using optical-density-measurement unit 39 (shown in FIG. 2C)). For some applications, first set 52 of sample chambers includes a plurality of sample chambers, while second set 54 of sample chambers includes only a single sample chamber, as shown. However, the scope of the present application, includes using any number of sample chambers (e.g., a single sample chamber or a plurality of sample chambers) within either the first set of sample chambers or within the second set of sample chambers, or any combination thereof. The first portion of the blood sample is typically diluted with respect to the second portion of the blood sample. For example, the diluent may contain pH buffers, stains, fluorescent stains, antibodies, sphering agents, lysing agents, etc. Typically, the second portion of the blood sample, which is placed inside second set 54 of sample chambers is a natural, undiluted blood sample. Alternatively or additionally, the second portion of the blood sample may be a sample that underwent some modification, including, for example, one or more of dilution (e.g., dilution in a controlled fashion), addition of a component or reagent, or fractionation.

For some applications, one or more staining substances are used to stain the first portion of the blood sample (which is placed inside first set 52 of sample chambers) before the sample is imaged microscopically. For example, the staining substance may be configured to stain DNA with preference over staining of other cellular components. Alternatively, the staining substance may be configured to stain all cellular nucleic acids with preference over staining of other cellular components. For example, the sample may be stained with acridine orange reagent, Hoechst reagent, and/or any other staining substance that is configured to preferentially stain DNA and/or RNA within the blood sample. Optionally, the staining substance is configured to stain all cellular nucleic acids but the staining of DNA and RNA are each more prominently visible under some lighting and filter conditions, as is known, for example, for acridine orange. Images of the sample may be acquired using imaging conditions that allow detection of cells (e.g., brightfield) and/or imaging conditions that allow visualization of stained bodies (e.g. appropriate fluorescent illumination). Typically, the first portion of the sample is stained with acridine orange and with a Hoechst reagent. For example, the first (diluted) portion of the blood sample may be prepared using techniques as described in U.S. Pat. No. 9,329,129 to Pollak, which is incorporated herein by reference, and which describes a method for preparation of blood samples for analysis that involves a dilution step, the dilution step facilitating the identification and/or counting of components within microscopic images of the sample. For some applications, the first portion of the sample is stained with one or more stains that cause platelets within the sample to be visible under brightfield imaging conditions and/or under fluorescent imaging conditions, e.g., as described hereinabove. For example, the first portion of the sample may be stained with methylene blue and/or Romanowsky stains.

Typically, prior to being imaged microscopically, the first portion of blood (which is placed in first set 52 of sample chambers) is allowed to settle such as to form a monolayer of cells, e.g., using techniques as described in U.S. Pat. No. 9,329,129 to Pollak, which is incorporated herein by reference. For some applications, the first portion of blood is a cell suspension and the chambers belonging to the first set 52 of chambers each define a cavity 55 that includes a base surface 57 (shown in FIG. 3C). Typically, the cells in the cell suspension are allowed to settle on the base surface of the sample chamber of the carrier to form a monolayer of cells on the base surface of the sample chamber. Subsequent to the cells having been left to settle on the base surface of the sample chamber (e.g., by having been left to settle for a predefined time interval), at least one microscopic image of at least a portion of the monolayer of cells is typically acquired. Typically, a plurality of images of the monolayer are acquired, each of the images corresponding to an imaging field that is located at a respective, different area within the imaging plane of the monolayer. Typically, an optimum depth level at which to focus the microscope in order to image the monolayer is determined, e.g., using techniques as described in U.S. Pat. No. 10,176,565 to Greenfield, which is incorporated herein by reference. For some applications, respective imaging fields have different optimum depth levels from each other.

It is noted that, in the context of the present application, the term monolayer is used to mean a layer of cells that have settled, such as to be disposed within a single focus field of the microscope. Within the monolayer there may be some overlap of cells, such that within certain areas there are two or more overlapping layers of cells. For example, red blood cells may overlap with each other within the monolayer, and/or platelets may overlap with, or be disposed above, red blood cells within the monolayer.

For some applications, the microscopic analysis of the first portion of the blood sample is performed with respect to the monolayer of cells. Typically, the first portion of the blood sample is imaged under brightfield imaging, i.e., under illumination from one or more light sources (e.g., one or more light emitting diodes, which typically emit light at respective spectral bands). Further typically, the first portion of the blood sample is additionally imaged under fluorescent imaging. Typically, the fluorescent imaging is performed by exciting stained objects (i.e., objects that have absorbed the stain(s)) within the sample by directing light toward the sample at known excitation wavelengths (i.e., wavelengths at which it is known that stained objects emit fluorescent light if excited with light at those wavelengths), and detecting the fluorescent light. Typically, for the fluorescent imaging, a separate set of light sources (e.g., one or more light emitting diodes) is used to illuminate the sample at the known excitation wavelengths.

As described with reference to US 2019/0302099 to Pollak, which is incorporated herein by reference, for some applications, sample chambers belonging to set 52 (which is used for microscopy measurements) have different heights from each other, in order to facilitate different measurands being measured using microscope images of respective sample chambers, and/or different sample chambers being used for microscopic analysis of respective sample types. For example, if a blood sample, and/or a monolayer formed by the sample, has a relatively low density of red blood cells, then measurements may be performed within a sample chamber of the sample carrier having a greater height (i.e., a sample chamber of the sample carrier having a greater height relative to a different sample chamber having a relatively lower height), such that there is a sufficient density of cells, and/or such that there is a sufficient density of cells within the monolayer formed by the sample, to provide statistically reliable data. Such measurements may include, for example red blood cell density measurements, measurements of other cellular attributes, (such as counts of abnormal red blood cells, red blood cells that include intracellular bodies (e.g., pathogens, Howell-Jolly bodies), etc.), and/or hemoglobin concentration. Conversely, if a blood sample, and/or a monolayer formed by the sample, has a relatively high density of red blood cells, then such measurements may be performed upon a sample chamber of the sample carrier having a relatively low height, for example, such that there is a sufficient sparsity of cells, and/or such that there is a sufficient sparsity of cells within the monolayer of cells formed by the sample, that the cells can be identified within microscopic images. For some applications, such methods are performed even without the variation in height between the sample chambers belonging to set 52 being precisely known.

For some applications, based upon the measurand that is being measured, the sample chamber within the sample carrier upon which to perform optical measurements is selected. For example, a sample chamber of the sample carrier having a greater height may be used to perform a white blood cell count (e.g., to reduce statistical errors which may result from a low count in a shallower region), white blood cell differentiation, and/or to detect more rare forms of white blood cells. Conversely, in order to determine mean corpuscular hemoglobin (MCH), mean corpuscular volume (MCV), red blood cell distribution width (RDW), red blood cell morphologic features, and/or red blood cell abnormalities, microscopic images may be obtained from a sample chamber of the sample carrier having a relatively low height, since in such sample chambers the cells are relatively sparsely distributed across the area of the region, and/or form a monolayer in which the cells are relatively sparsely distributed. Similarly, in order to count platelets, classify platelets, and/or extract any other attributes (such as volume) of platelets, microscopic images may be obtained from a sample chamber of the sample carrier having a relatively low height, since within such sample chambers there are fewer red blood cells which overlap (fully or partially) with the platelets in microscopic images, and/or in a monolayer.

In accordance with the above-described examples, it is preferable to use a sample chamber of the sample carrier having a lower height for performing optical measurements for measuring some measurands within a sample (such as a blood sample), whereas it is preferable to use a sample chamber of the sample carrier having a greater height for performing optical measurements for measuring other measurands within such a sample. Therefore, for some applications, a first measurand within a sample is measured, by performing a first optical measurement upon (e.g., by acquiring microscopic images of) a portion of the sample that is disposed within a first sample chamber belonging to set 52 of the sample carrier, and a second measurand of the same sample is measured, by performing a second optical measurement upon (e.g., by acquiring microscopic images of) a portion of the sample that is disposed within a second sample chamber of set 52 of the sample carrier. For some applications, the first and second measurands are normalized with respect to each other, for example, using techniques as described in US 2019/0145963 to Zait, which is incorporated herein by reference.

Figure 4:
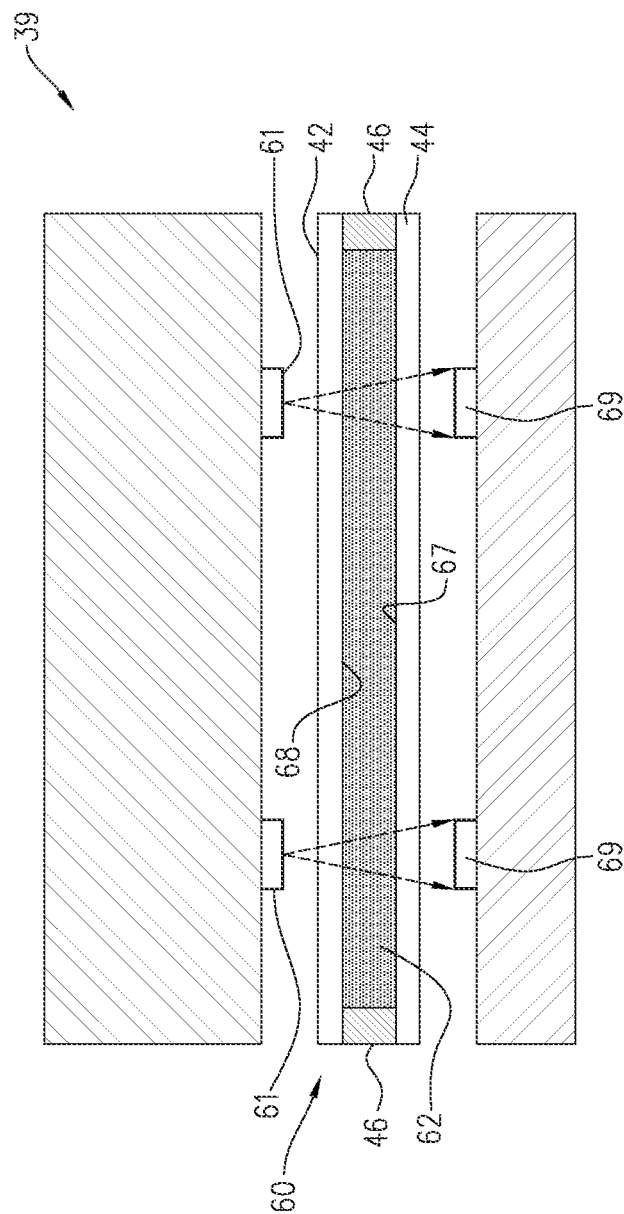
FIG. 4 is a schematic cross-sectional illustration of a sample chamber disposed inside an optical measurement unit, in accordance with some applications of the present invention.

Reference is now made to FIG. 4, which is a schematic cross-sectional illustration of a sample chamber 60 (e.g., a sample chamber belonging to set 54 of sample chambers of sample carrier 22) disposed inside optical-density-measurement unit 39 of optical measurement unit 31, in accordance with some applications of the present invention. As described hereinabove, while the sample is disposed in the sample carrier, optical measurements are performed upon the sample using one or more optical measurement devices 24 belonging to optical measurement unit 31. Typically, sample chambers belonging to set 54 of sample chambers of sample carrier 22 are used for performing optical density measurements upon a portion 62 of the sample, e.g., using optical-density-measurement unit 39. For example, the concentration and/or density of a component may be measured by performing optical absorption, transmittance, fluorescence, and/or luminescence measurements upon the sample. For some applications, the optical-density-measurement unit 39 includes a set of one or more light sources 61 (e.g., LEDs) and one or more light detectors 69. For some applications, the light sources transmit light via the sample, the light detectors receive the light that passes through the sample, and the computer processor performs optical absorption and/or transmittance measurements based upon the received light.

Referring again to FIG. 2B, typically, the optical measurement unit includes a stage 64, which is configured to support sample carrier 22 within the optical measurement unit. Further typically, the stage supports the sample carrier within the optical measurement unit such that molded component 42 of the sample carrier is disposed above the glass layer 44, and such that the light detectors are disposed below the glass layer of the sample carrier. The sample carrier is formed by adhering the glass layer to the molded component. For example, the glass layer and the molded component may be bonded to each other during manufacture or assembly (e.g. using thermal bonding, solvent-assisted bonding, ultrasonic welding, laser welding, heat staking, adhesive, mechanical clamping and/or additional substrates). For some applications, the glass layer and the molded component are bonded to each other during manufacture or assembly using adhesive layer 46, shown in FIGS. 3C and 4, for example.

Typically, in order to perform optical density measurements upon the sample, it is desirable to know the optical path length, the volume, and/or the thickness of the portion of the sample upon which the optical measurements were performed, as precisely as possible. For some applications, the optical measurements described herein are performed upon a portion of the sample that is disposed in a sample chamber that is defined by two or more opposing surfaces. In order to provide the desired level of precision, it is desirable for the two or more opposing surfaces to be separated by a distance that is correspondingly tightly set or tightly controlled. However, in some manufacture or assembly processes, the distance between the opposing surfaces may vary substantially. For example, as described herein, two or more of the opposing surfaces may lie in separate substrates that are bonded relative to each other during manufacture or assembly (e.g. using thermal bonding, solvent-assisted bonding, ultrasonic welding, laser welding, heat staking, adhesive, mechanical clamping and/or additional substrates).

For example, as shown in FIG. 4, the height of sample chamber 60 is defined by a lower surface 67 that is defined by the glass layer 44 and by an upper surface 68 that is defined by molded component 42. The first and second substrates are bonded to each other by adhesive layer 46. Examples of the adhesive layer include an additional physical layer (such as a pressure-sensitive adhesive layer), a sandwich of pressure-sensitive adhesive and a carrier layer (such as a polyethylene terephthalate layer), a bonding layer (such as a solvent-assisted bonding layer), or a layer resulting from a process performed upon the top and bottom substrates (such as ultrasonic welding) without necessarily introducing additional materials or pieces. Although the adhesive layer has a nominal thickness, it is typically the case that, for example, due to variation in the manufactured thickness of the pressure-sensitive adhesive or in the pressure applied during its application, the actual thickness of the layer is different from the nominal thickness. For example, the glass layer and the molded component may be bonded using a pressure-sensitive adhesive layer with a nominal thickness that is configured to separate the opposing surfaces by a separation of 100 microns. In such a case, variation in the manufactured thickness of the pressure-sensitive adhesive layer or in the pressure applied during its application may result in a final thickness that may lie, for example, as far as 20 microns greater or less than the nominal thickness.

Without being bound by theory, an uncertainty of 20 percent in the distance separating the two opposing surfaces (as described in the above example), may, in turn, correspond to 20 percent uncertainty in parameters of the sample that are derived from the optical measurements that are performed upon the sample (such as, the derived concentration and/or density of a component within the sample). For example, for some applications, the concentration of a component is determined by measuring optical absorption. The absorption measurements are analyzed based upon the Beer-Lambert Law, in accordance with which the resulting optical intensity I after passing through a distance h in a sample containing concentration $\rho$ of a substance with absorptivity coefficient $\alpha$ is $I=I_0 \times e^{-\alpha \rho h}$, where $I_0$ is incident the light intensity before passing through the sample. Thus, for some applications, when passing light through a sample within a sample chamber having a height h (which is defined by the distance between the opposing surfaces), I and $I_0$ are measured and the concentration of a given component is deduced using the known height and the known absorptivity coefficient of the component. For example, such a technique may be used to measure the hemoglobin concentration of a blood sample (e.g., using absorption techniques that are known in the art, such as, by first staining hemoglobin using a suitable dye that provides an optical absorption signature, or by performing the measurements upon unstained hemoglobin). For such techniques, uncertainty in the height of the sample chamber results in a corresponding uncertainty in the derived concentration.

In accordance with some applications of the present invention, the above-described problems associated with uncertainty relating to the height of a sample chamber are at least partially overcome. For some applications, in addition to measuring the absorption of the analyte (e.g., hemoglobin), the absorption of the medium (e.g., the solvent in the case of a solution) in which the analyte is disposed is measured. Typically, wavelengths at which the absorption measurements are performed are selected, based upon the absorption profiles of, respectively, the analyte and the medium, as described in further detail hereinbelow. Assuming the analyte and the medium mass concentrations are $c_a$ and $c_s$ respectively, and their absorption coefficients as a function of wavelength ($\lambda$) are $\alpha_a(\lambda)$ and $\alpha_s(\lambda)$, respectively, then according to the Beer-Lambert law, the transmitted light intensity at a given wavelength is provided as:

$$I = I_0 \times \exp[-1 \times (\alpha_a(\lambda) \times c_a + \alpha_s(\lambda) \times c_s)],$$

where $I_0$ is the incident light intensity and I is the length through the sample (corresponding to the height of the sample chamber).

Typically, the height of the sample chamber through which the light is transmitted in order to perform optical absorption or transmittance measurements is in the order of between 50 microns and 300 microns. However, as described hereinabove, it is typically the case that the exact height of the sample chamber is unknown. If the length through the sample is not known to high accuracy, then using absorption measurements at two wavelengths, one needs to solve for I, $c_a$ and $c_s$, which appear to be an undeterminable set of equations since there are three unknowns and only two equations. However, for some applications, it is assumed that the mass concentrations $c_a$ and $c_s$ are not independent. This is because, for an ideal mixture (in which the concentrations of components other than the analyte within the medium are assumed to be negligible), $c_a = \rho_a(1 - c_s/\rho_s)$, where $\rho_x$ is the mass density of the pure component.

Therefore, for some applications of the present invention, in a case in which the concentration of a single analyte that is dissolved within a solvent (or is mixed within a mixture) is to be determined, absorption measurements are performed at two wavelengths. Even though the precise height of the sample chamber in which the analyte is placed is not known, the Beer-Lambert equations are solved such as to determine the concentration of the analyte, by treating the concentration of the analyte as $c_a = \rho_a (1 - c_s/\rho_s)$.

For some applications, a generally similar technique is performed but the technique is modified such that the concentrations of two or more separate analytes that are within the medium are determined. For such applications, if there are n analytes the concentrations of which are to be determined, then n+1 absorption measurements are made at respective different wavelengths, and the corresponding equations are solved in order to determine the concentrations of the n analytes.

For some applications, the above-described techniques are used to determine the concentration of hemoglobin in blood. For some applications, the analyte includes a combination of variants of hemoglobin, for example, two or more of oxyhemoglobin, deoxyhemoglobin, methemoglobin, carboxyhemoglobin, etc. For some such applications, an isosbestic point in the absorption profiles of the two or more variants of hemoglobin is chosen as the wavelength for one of the two absorption measurements, and the computer processor determines an overall concentration of the two or more variants of hemoglobin by using that absorption measurement in combination with one additional absorption measurement.

Typically, for applications in which hemoglobin is the analyte (or a combination of variants of hemoglobin is the analyte), water is treated as the medium in which the hemoglobin is disposed, and the concentrations of components other than hemoglobin are assumed to be negligible. Typically, prior to performing such measurements, the red blood cells within the blood sample are lysed. For some applications, the hemoglobin is treated using a known method, such as modified azide-methemoglobin, cyanohemoglobin, SLS methods, etc., such that the variants of hemoglobin within the sample are transformed into a single compound. Typically, for such applications, a first absorption measurement is made at a wavelength band at which absorption of light by hemoglobin is relatively high, e.g., within the green or red portion of the visible spectrum. For example, a wavelength band that is centered around a wavelength of more than 500 nm and/or less than 650 nm (e.g., 500-650 nm) may be used for the first absorption measurement. For some applications, a wavelength band that is centered around a wavelength of approximately 505 nm (e.g., between 495 nm and 515 nm), and/or a wavelength of approximately 570 nm (e.g., between 560 nm and 580 nm), is used. Typically within this range of wavelengths, the absorption of hemoglobin is in the order of $10^4$ (1/m). Typically, the width of the wavelength band that is used for the first absorption measurement is between 1 nm and 10 nm.

For some applications, for the second absorption measurement, a range of wavelengths of light is used at which water has a similar level of absorption to that of hemoglobin within the range of wavelengths that is used for the first absorption measurement. Theoretically, this would be achievable by using light in the far UV range, but this is typically impractical. Therefore, typically, light within the mid-IR range is used for the second absorption measurement. For some applications, light with a wavelength band that is centered around a wavelength of greater than 1200 nm and/or less than 3,000 nm (e.g., less than 1600 nm), e.g., light with a wavelength band that is centered around a wavelength of 1,200 nm-3,000 nm, or 1,200 nm-1,600 nm, is used. Further typically, within this wavelength range, the second absorption measurement is performed at a local minimum or maximum in the absorption spectrum of water. For some applications, the second absorption measurement is performed at a wavelength band that is centered around a local maximum in the absorption spectrum of water, e.g., at approximately 1450 nm (e.g., 1440-1460 nm). Typically, the width of the wavelength band that is used for the second absorption measurement is between 1 nm and 50 nm.

For some applications, light detectors 69 (shown in FIG. 4) include at least some light detectors that are not based upon silicon semiconductors, since these are not suitable for measurements of light at wavelengths that are greater than approximately 1100 nm. Typically, the light detectors include germanium-based detectors and/or In—Ga—Ar-based detectors.

As described hereinabove, typically for applications in which optical absorption measurements are performed at two wavelengths in order to determine the optical density of hemoglobin, the red blood cells within the blood sample are lysed. Alternatively, for some applications, the red blood cells are not lysed. For such applications, the red blood cells typically cause light that passes through the sample to be scattered, which interferes with the measurements that are performed at one or both of the wavelengths. For some such applications, in order to account for the aforementioned scatter, a third measurement is conducted in a wavelength range in which both the hemoglobin and the water absorption is negligible. For example, a wavelength band that is centered around a wavelength of more than 650 nm and/or less than 1000 nm (e.g. 650 nm-1000 nm) may be used, and the absorption measurements may be corrected for scatter/turbidity using the measurement that is performed within this wavelength range.

For some applications, the above-described techniques are applied in order to determine the optical densities of each of a plurality of variants of hemoglobin (e.g., oxyhemoglobin, deoxyhemoglobin, methemoglobin, carboxyhemoglobin, etc.) individually. In accordance with the technique described hereinabove, assuming that the optical densities of n variants of hemoglobin are to be determined, then n+J absorption measurements are made, and the corresponding equations are solved in order to determine the concentrations of the n variants of hemoglobin. Typically, a local maximum in the absorption spectrum of each of the n variants of hemoglobin is selected for n absorption measurements. Further typically, for the one additional absorption measurement, light within the mid-IR range is used. For some applications, light with a wavelength band that is centered around a wavelength of greater than 1200 nm and/or less than 3,000 nm (e.g., less than 1600 nm), e.g., light with a wavelength band that is centered around a wavelength of 1,200 nm-3,000 nm, or 1,200 nm-1,600 nm, is used. As described hereinabove, for some applications, within this wavelength range, the additional absorption measurement is performed at a local minimum or maximum in the absorption spectrum of water. For some applications, the second absorption measurement is performed at a wavelength band that is centered around a local maximum in the absorption spectrum of water, e.g., at approximately 1450 nm (e.g., 1440-1460 nm).

As described hereinabove, for some applications, the above-described techniques are applied in order to determine the optical density of a combination of variants of hemoglobin (for example, two or more of oxyhemoglobin, deoxyhemoglobin, methemoglobin, carboxyhemoglobin, etc.). For some such applications, an isosbestic point in the absorption profiles of the two or more variants of hemoglobin is chosen as the wavelength for one of the two absorption measurements, and the computer processor determines an overall concentration of the two or more variants of hemoglobin by using that absorption measurement in combination with one additional absorption measurement. Typically, for the one additional absorption measurement, light within the mid-IR range is used. For some applications, light with a wavelength band that is centered around a wavelength of greater than 1200 nm and/or less than 3,000 nm (e.g., less than 1600 nm), e.g., light with a wavelength band that is centered around a wavelength of 1,200 nm-3,000 nm, or 1,200 nm-1,600 nm, is used. As described hereinabove, for some applications, within this wavelength range the additional absorption measurement is performed at a local minimum or maximum in the absorption spectrum of water. For some applications, the second absorption measurement is performed at a wavelength band that is centered around a local maximum in the absorption spectrum of water, e.g., at approximately 1450 nm (e.g., 1440-1460 nm).

For some applications, based upon the two or more absorption measurements that are performed, the Beer-Lambert equations are solved by the computer processor, to determine the actual height of the sample chamber in which the blood sample is disposed. For example, with reference to FIG. 4, the equations may be solved to determine the height of sample chamber 60. Typically, the computer processor then uses the determined height of the sample chamber in determining other parameters of the sample (e.g., the optical density of other entities within the sample). For some applications, based upon the determined height of sample chamber, the computer processor is configured to derive the heights of additional sample chambers within the same sample carrier. For example, for sample carrier 22 shown in FIGS. 3A-C, the heights of each of the sample chambers within the sample carrier is dependent upon the thickness of adhesive layer 46. Therefore, assuming that the thickness of the adhesive layer within a single sample carrier is consistent, once the height of one of the sample chambers is determined, then the heights of additional sample chambers can be derived.

For some applications, the density (e.g. count per unit volume) of a component within the blood sample is measured. For example, microscopic images of a portion of the sample that is disposed within sample chambers belonging to set 52 of sample chambers may be analyzed in order to determine a count per unit volume of certain entities, as described hereinabove. For example, such measurements may be performed in order to count the number of red blood cells, white blood cells, platelets, reticulocytes, Howell-Jolly bodies, bacteria, and/or parasites of a given type per unit volume, such as when performing a complete blood count or a diagnostic test. Typically, for such applications, images (e.g., microscopic images) of the sample are acquired, and the count per unit volume is determined based upon the count of the component within the images and the corresponding volume within which the count was measured. As the volume is equal to height times area, any uncertainty in the height of the sample chamber results in uncertainty in the volume, and a corresponding uncertainty in the count per unit volume. For some applications, in order to perform any one of the above-described measurements, the height of a sample chamber is determined using the techniques described hereinabove.

It is noted that the scope of the present application should not be construed as being limited to the specific example of the sample carrier that is shown in the figures and described hereinabove, or as being limited to being used with hemoglobin as the analyte and water as the medium. Rather, the scope of the present application includes performing techniques described herein for performing optical density measurements within a sample chamber having an unknown height with any analyte, within any medium (e.g., solvent), and with any sample chamber having an unknown height. For example, the techniques described herein may be performed to determine any one of the following parameters of a sample, mutatis mutandis: bacteria or virus concentration, contaminant concentration (e.g. in drinking water), turbidity measurement (e.g. in water, urine), and enzymatic assays (including enzyme-linked immunosorbent assays).

In accordance with some applications, techniques as described in US 2019/0302099 to Pollak (which is incorporated herein by reference), are used to overcome problems associated with uncertainty relating to the height of a sample chamber. For some applications, such techniques are performed as an alternative or in addition to the medium absorption techniques described hereinabove. For example, referring again to FIG. 3B, for some applications, sample chambers belonging to set 54 (which is used for optical density measurements), define at least a first region 56 (which is typically deeper) and a second region 58 (which is typically shallower), the height of the sample chambers varying between the first and second regions in a predefined manner, e.g., as described in US 2019/0302099 to Pollak, which is incorporated herein by reference. The heights of first region 56 and second region 58 of the sample chamber are defined by a lower surface that is defined by the glass layer and by an upper surface that is defined by the molded component. The upper surface at the second region is stepped with respect to the upper surface at the first region. The step between the upper surface at the first and second regions, provides a predefined height difference $\Delta h$ between the regions, such that even if the absolute height of the regions is not known to a sufficient degree of accuracy (for example, due to tolerances in the manufacturing process), the height difference $\Delta h$ is known to a sufficient degree of accuracy to determine a parameter of the sample, using the techniques described herein, and as described in US 2019/0302099 to Pollak, which is incorporated herein by reference. For some applications, the height of the sample chamber varies from the first region 56 to the second region 58, and the height then varies again from the second region to a third region 59, such that, along the sample chamber, first region 56 define a maximum height region, second region 58 defines a medium height region, and third region 59 defines a minimum height region. For some applications, additional variations in height occur along the length of the sample chamber, and/or the height varies gradually along the length of the sample chamber. Alternative or additional variations in height (e.g., stepped variations in height or gradual variations in height) along the length of the sample chamber may be used as an alternative or in addition to the step between the first and second regions, for example, using the techniques described herein, and as described in US 2019/0302099 to Pollak, which is incorporated herein by reference.

Figure 5A:
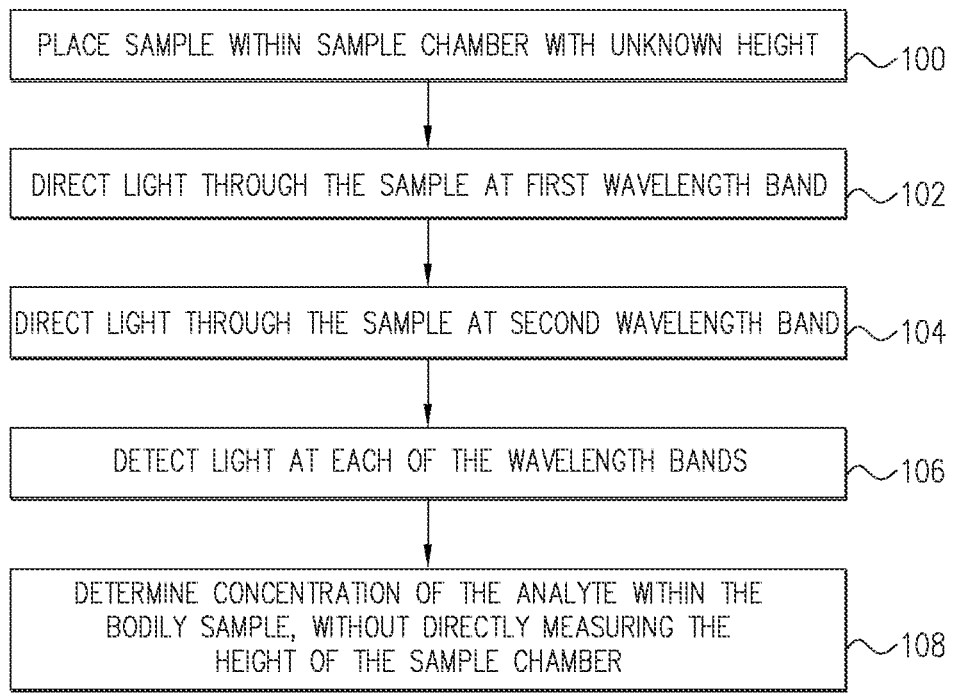
FIGS. 5A and 5B are flowcharts showing steps that are performed, in accordance with some applications of the present invention.
Figure 5B:
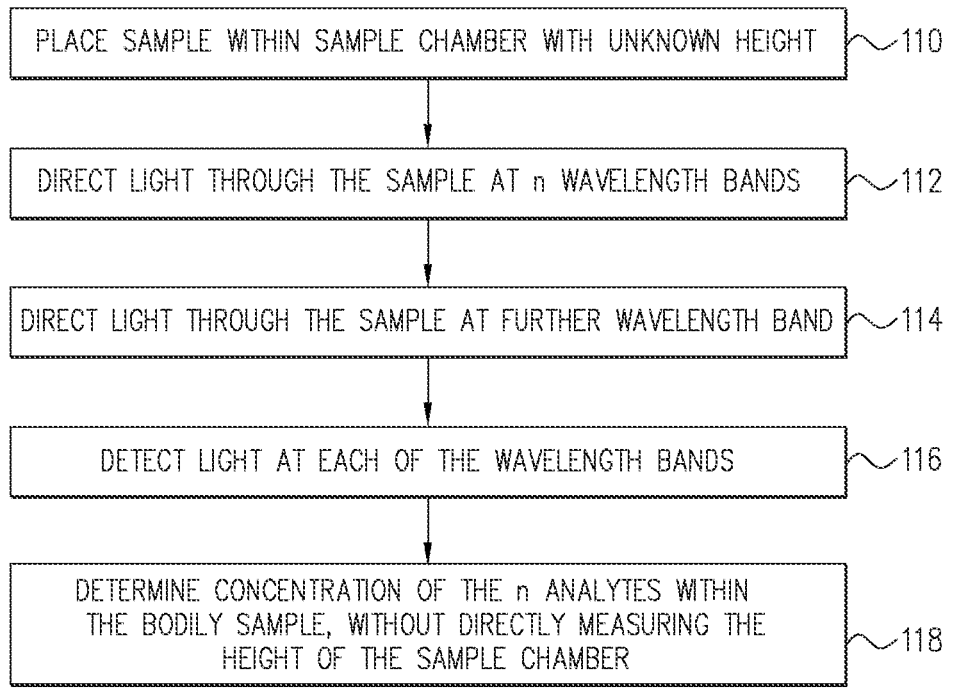

Reference is now made to FIGS. 5A and 5B, which are flowcharts showing steps that are performed (typically by computer processor) 28, in accordance with some applications of the present invention. The flowcharts in FIGS. 5A and 5B are based upon the above-described techniques.

Referring to FIG. 5A, for some applications, in a first step 100, a bodily sample (e.g., a blood sample) is placed within a sample chamber having an unknown height (e.g., a sample chamber belonging to set 54 of sample chambers). Subsequently, light is directed through the sample chamber at a first wavelength band (step 102), and at a second wavelength band (step 104). The light that is transmitted through (or reflected from) the sample at each of the wavelength bands is detected (step 106). Subsequently, the concentration of an analyte within the sample is determined, without directly measuring the height of the sample chamber (step 108).

Referring to FIG. 5B, for some applications, in a first step 110, a bodily sample (e.g., a blood sample) is placed within a sample chamber having an unknown height (e.g., a sample chamber belonging to set 54 of sample chambers). Subsequently, light is directed through the sample chamber at n wavelength bands (step 112), and at a further wavelength band (step 114). The light that is transmitted through (or reflected from) the sample at each of the wavelength bands is detected (step 116). Subsequently, the concentration of n analytes within the sample are determined, without directly measuring the height of the sample chamber (step 118).

Referring again to FIG. 2B, typically, sample carrier 22 is supported within the optical measurement unit by stage 64. Further typically, the stage has a forked design, such that the sample carrier is supported by the stage around the edges of the sample carrier, but such that the stage does not interfere with the visibility of the sample chambers of the sample carrier by the optical measurement devices. For some applications, the sample carrier is held within the stage, such that molded component 42 of the sample carrier is disposed above the glass layer 44, and such that an objective lens 66 of a microscope unit of the optical measurement unit is disposed below the glass layer of the sample carrier. Typically, at least some light sources 65 that are used during microscopic measurements that are performed upon the sample (for example, light sources that are used during brightfield imaging) illuminate the sample carrier from above the molded component. Further typically, at least some additional light sources (not shown) illuminate the sample carrier from below the sample carrier (e.g., via the objective lens). For example, light sources that are used to excite the sample during fluorescent microscopy may illuminate the sample carrier from below the sample carrier (e.g., via the objective lens).

Reference is now made to FIGS. 6A, 6B, 6C, and 6D which are schematic illustrations of sample carrier stage 64 of optical measurement unit 31, in accordance with some applications of the present invention. FIG. 6A shows a regular isometric view, FIG. 6B shows an exploded isometric view, FIG. 6C shows a top view, and FIG. 6D shows a cross-sectional view. As described hereinabove, typically, the stage has a forked design, such that the sample carrier is supported around the edges of the sample carrier, but such that the stage itself does not interfere with the visibility of the sample chambers of the sample carrier by the optical measurement devices. For some applications, during an optical-measurement-unit-calibration phase, the stage is rotatable about the x and y axes of the of the microscope unit, and the orientation of the stage is calibrated such that the stage defines a plane that is perpendicular to the z-axis. (As used herein, the z-axis refers to the optical axis of the microscope unit and the x and y axes refer to two mutually-perpendicular axes within the plane that lies perpendicular to the z-axis.)

For some applications, three stage-leveling screws 70 (as shown) are coupled to (e.g., screwed into) a base plate 71 in order to fix the orientation of the stage with respect to the z-axis. Optionally (not shown), additional stage-leveling screws are used. For some applications, the stage additionally includes a spring-screw component 72 that includes a screw 74 and a spring 76. Typically, during the optical-measurement-unit-calibration phase, screw 74 is not fastened with respect to the base plate. Further typically, in this configuration, the spring facilitates controlled movement of the stage with respect to base plate 71. As described above, during the calibration of the orientation of the stage, stage-leveling screws 70 are coupled to base plate 71 in order to fix the orientation of the stage with respect to the z-axis. In some cases, subsequent to the optical-measurement-unit-calibration phase, and during the insertion of a sample carrier into stage 64, one or more of the stage-leveling screws can become separated from base plate 71 (for example, in response to the sample carrier being pushed into the stage with undue force). Therefore, for some applications, once the calibration of the orientation of the stage has been completed, screw 74 is fastened with respect to the base plate, such that the screw fixes the stage in position with respect to the base plate (i.e., such that the spring no longer permits movement of the stage with respect to the base plate). For example, the screw may be wedged into a hole 75 defined by base plate 71. For some applications, a plurality of spring-screw components are used in the aforementioned manner.

Figure 7B:
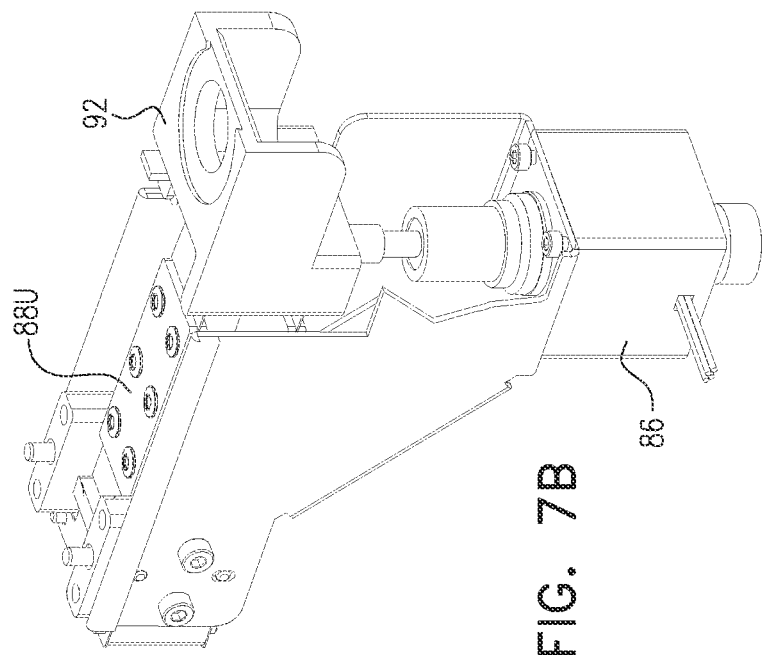
FIGS. 7A and 7B are schematic illustrations of a cantilever configured to support an objective lens of a microscope above a camera of the microscope, and to control movement of the objective lens with respect to the camera, in accordance with some applications of the present invention.
Figure 7A:
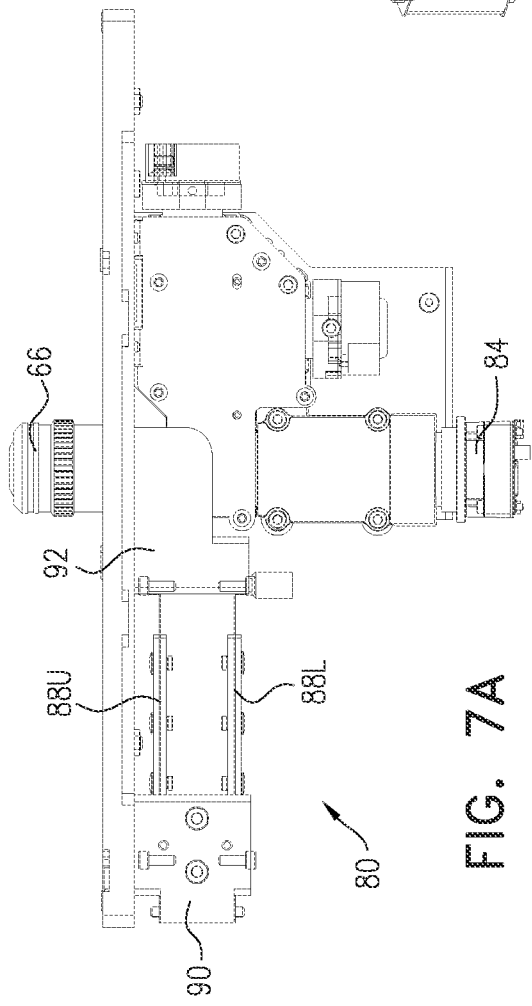

Reference is now made to FIGS. 7A and 7B, which are schematic illustrations of a cantilever 80 configured to support an objective lens 66 of a microscope above a camera 84 of the microscope, and to control movement of the objective lens with respect to the camera, in accordance with some applications of the present invention. FIG. 7A shows a side view of the cantilever in the presence of the objective lens and microscope, while FIG. 7B shows an isometric view of the cantilever in the absence of the objective lens and the microscope camera for illustrative purposes. For some applications, the objective lens is an infinity-corrected objective lens. Typically, in order to correctly bring the sample into focus upon the microscope camera, the objective lens is moved along the z-axis. For some applications, a stepper motor 86 (shown in FIG. 7B) is used to provide movement along the z-axis to the cantilever. Typically, the cantilever is configured to support the objective lens above the camera in a floating configuration. For some applications, during movement of the cantilever, the cantilever supports the objective lens such that the optical axis of the objective lens is aligned with the camera without the objective lens being directly connected to the camera. Typically, during movement of the cantilever, the cantilever supports the objective lens without the objective lens being disposed along a rail with respect to the camera, and/or without anything coming between the objective lens and the camera that would obscure the view that the camera has through the objective lens.

For some applications, the cantilever comprises upper and lower horizontal sheets of a material 88U, 88L (e.g., sheets of metal) that are coupled to each other via a vertical coupling element 90. Typically, the upper horizontal sheet of material is coupled to an objective-lens housing 92, which houses the objective lens. Further typically, the lower horizontal sheet of material is moved by the stepper motor. For some applications (not shown), one or more springs are disposed between portions of the cantilever in order to stabilize portions of the cantilever with respect to each other during motion of the cantilever. For example, a spring may be disposed between objective lens housing 92 and the upper horizontal sheet of material.

For some applications, the sample as described herein is a sample that includes blood or components thereof (e.g., a diluted or non-diluted whole blood sample, a sample including predominantly red blood cells, or a diluted sample including predominantly red blood cells), and parameters are determined relating to components in the blood such as platelets, white blood cells, anomalous white blood cells, circulating tumor cells, red blood cells, reticulocytes, Howell-Jolly bodies, etc.

Applications of the invention described herein can take the form of a computer program product accessible from a computer-usable or computer-readable medium (e.g., a non-transitory computer-readable medium) providing program code for use by or in connection with a computer or any instruction execution system, such as computer processor 28. For the purposes of this description, a computer-usable or computer readable medium can be any apparatus that can comprise, store, communicate, propagate, or transport the program for use by or in connection with the instruction execution system, apparatus, or device. The computer-readable medium can be an electronic, magnetic, optical, electromagnetic, infrared, or semiconductor system (or apparatus or device) or a propagation medium. Typically, the computer-usable or computer readable medium is a non-transitory computer-usable or computer readable medium.

Examples of a computer-readable medium include a semiconductor or solid state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor (e.g., computer processor 28) coupled directly or indirectly to memory elements (e.g., memory 30) through a system bus. The memory elements can include local memory employed during actual execution of the program code, bulk storage, and cache memories which provide temporary storage of at least some program code in order to reduce the number of times code must be retrieved from bulk storage during execution. The system can read the inventive instructions on the program storage devices and follow these instructions to execute the methodology of the embodiments of the invention.

Network adapters may be coupled to the processor to enable the processor to become coupled to other processors or remote printers or storage devices through intervening private or public networks. Modems, cable modem and Ethernet cards are just a few of the currently available types of network adapters.

Computer program code for carrying out operations of the present invention may be written in any combination of one or more programming languages, including an object-oriented programming language such as Java, Smalltalk, C++ or the like and conventional procedural programming languages, such as the C programming language or similar programming languages.

It will be understood that algorithms described herein, can be implemented by computer program instructions. These computer program instructions may be provided to a processor of a general-purpose computer, special purpose computer, or other programmable data processing apparatus to produce a machine, such that the instructions, which execute via the processor of the computer (e.g., computer processor 28) or other programmable data processing apparatus, create means for implementing the functions/acts specified in the algorithms described in the present application. These computer program instructions may also be stored in a computer-readable medium (e.g., a non-transitory computer-readable medium) that can direct a computer or other programmable data processing apparatus to function in a particular manner, such that the instructions stored in the computer-readable medium produce an article of manufacture including instruction means which implement the function/act specified in the flowchart blocks and algorithms. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the algorithms described in the present application.

Computer processor 28 is typically a hardware device programmed with computer program instructions to produce a special purpose computer. For example, when programmed to perform the algorithms described herein, computer processor 28 typically acts as a special purpose sample-analysis computer processor. Typically, the operations described herein that are performed by computer processor 28 transform the physical state of memory 30, which is a real physical article, to have a different magnetic polarity, electrical charge, or the like depending on the technology of the memory that is used.

The apparatus and methods described herein may be used in conjunction with apparatus and methods described in any one of the following patents or patent applications, all of which are incorporated herein by reference:

U.S. Pat. No. 9,522,396 to Bachelet;
U.S. Pat. No. 10,176,565 to Greenfield;
U.S. Pat. No. 10,640,807 to Pollak;
U.S. Pat. No. 9,329,129 to Pollak;
U.S. Pat. No. 10,093,957 to Pollak;
U.S. Pat. No. 10,831,013 to Yorav Raphael;
U.S. Pat. No. 10,843,190 to Bachelet;
U.S. Pat. No. 10,482,595 to Yorav Raphael;
U.S. Pat. No. 10,488,644 to Eshel;
WO 17/168411 to Eshel;
US 2019/0302099 to Pollak;
US 2019/0145963 to Zait; and
WO 19/097387 to Yorav-Raphael.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. An Apparatus for use with a microscopy unit that comprises an objective lens and a microscope camera, and for use with a bodily sample that contains an analyte disposed within water, the apparatus comprising:
    a cantilever comprising an objective lens housing;
    a motor configured to move the cantilever along a direction of an optical axis of the objective lens;
    a sample chamber configured to receive the bodily sample, a height of the sample chamber being unknown;
    an optical-density-measurement unit comprising:
        one or more light sources configured to:
        direct light through the sample at a first wavelength band, at which absorption of light by the analyte is relatively high, and
        direct light through the sample at a second wavelength band that is centered around a wavelength of between 1.200 nm and 3,000 nm; and
    one or more light detectors configured to detect light that passes through the sample at each of the first and second wavelength bands; and
    at least one computer processor configured, based upon the detected light at each of the first and second wavelength bands, to determine a concentration of the analyte within the bodily sample, without directly measuring the height of the sample chamber.

2. The apparatus according to claim 1, wherein the motor comprises a stepper motor.

3. The apparatus according to claim 1, wherein the objective lens includes an infinity-corrected objective lens and the objective lens housing is configured to house the infinity-corrected objective lens.

4. The apparatus according to claim 1, wherein the cantilever is configured to support the objective lens without the objective lens being disposed along a rail with respect to the camera.

5. The apparatus according to claim 1, wherein the apparatus is configured for use with a sample carrier and the apparatus further comprises:
    a stage configured to support the sample carrier within the microscopy unit, the stage being configured to be moveable, during an optical-measurement-unit-calibration phase, such that an orientation of the stage can be adjusted with respect to the optical axis of the objective lens;
    a base plate;
    three or more stage-leveling screws configured to fix an orientation of the stage with respect to the optical axis of the objective lens, by the stage-leveling screws being coupled to the base plate; and
    at least one spring-screw component comprising a spring and a screw, the spring-screw component being configured:
        to facilitate controlled movement of the stage with respect to base plate, during the optical-measurement-unit-calibration phase; and
        subsequent to the orientation of the stage having been calibrated with respect to the optical axis of the objective lens, to fix the stage in position with respect to the base plate, by the screw of the spring-screw component being fastened with respect to the base plate.

6. The apparatus according to claim 1, wherein the cantilever comprises upper and lower horizontal sheets of a material that are coupled to each other via a vertical coupling element.

7. The apparatus according to claim 6, further comprising one or more springs disposed between portions of the cantilever and configured to stabilize the portions of the cantilever with respect to each other during motion of the cantilever.

8. The apparatus according to claim 1, wherein the one or more light sources are further configured to direct light through the sample at a third wavelength band at which absorption of light by both the analyte and water is relatively low, wherein the one or more light detectors are further configured to detect light that passes through the sample at the third wavelength band, and wherein, based upon the detected light that passes through the sample at the third wavelength band, the computer processor is configured to account for scatter by the sample.

9. The apparatus according to claim 1, wherein the computer processor is configured:
    based upon the detected light at the second wavelength band, to determine the height of the sample chamber, and
    using the determined height of the sample chamber, to determine additional parameters of the bodily sample.

10. The apparatus according to claim 1, wherein the one or more light detectors comprise one or more light detectors that are configured to detect light that passes through the sample at the second wavelength band selected from the group consisting of: a germanium-based detector, an In—Ga—Ar-based detector, and a combination thereof.

11. The apparatus according to claim 1, wherein the one or more light sources are configured to direct light through the sample at a second wavelength band that is centered around a wavelength of between 1,200 nm and 1,600 nm.

12. The apparatus according to claim 11, wherein the one or more light sources are configured to direct light through the sample at a second wavelength band that is centered around a wavelength of between 1,440 nm and 1,460 nm.

13. The apparatus according to claim 1, wherein the apparatus is for use with a blood sample.

14. The apparatus according to claim 13, wherein the computer processor is configured to determine a concentration of a combination of a plurality of variants of hemoglobin within the blood sample.

15. The apparatus according to claim 13, wherein the one or more light sources are configured to direct light through the sample at a first wavelength band that is centered around an isosbestic point of the plurality of variants of hemoglobin.

16. The apparatus according to claim 1, wherein the cantilever is configured, during the movement of the cantilever, to support the objective lens within the objective lens housing such that an optical axis of the objective lens is aligned with the camera, without the objective lens being directly connected to the microscope camera.

17. An apparatus for use with a microscopy unit that comprises an objective lens and a microscope camera and for use with a bodily sample that contains n analytes disposed within a medium, the apparatus comprising:
  a cantilever comprising an objective lens housing;
  a motor configured to move the cantilever along a direction of an optical axis of the objective lens;
  a sample chamber configured to receive the bodily sample, a height of the sample chamber being unknown;
  an optical-density-measurement unit comprising:
    one or more light sources configured to:
      direct light through the sample at n wavelength bands, each of the n wavelength bands corresponding to a wavelength band at which absorption of light, by a respective one of the n analytes is relatively high, and
      direct light through the sample at a further wavelength band at which absorption of light by the medium is relatively high; and
    one or more light detectors configured to detect light that passes through the sample at each of the wavelength bands; and
  at least one computer processor configured, based upon the detected light at each of the wavelength bands, to determine a concentration of each of the n analytes within the bodily sample, without directly measuring the height of the sample chamber.

18. The apparatus according to claim 17, wherein the one or more light sources are configured to direct light through the sample at a still-further wavelength band at which absorption of light by both the medium and the n analytes is relatively low, wherein the one or more light detectors are further configured to detect light that passes through the sample at the still-further wavelength band, and wherein, based upon the detected light that passes through the sample at the still-further wavelength band, the computer processor is configured to account for scatter by the sample.

19. The apparatus according to claim 17, wherein the computer processor is configured:
  based upon the detected light at the further wavelength band, to determine the height of the sample chamber, and
  using the determined height of the sample chamber, to determine additional parameters of the bodily sample.

* * * * *